United States Patent
Zhu et al.

(10) Patent No.: US 11,528,507 B2
(45) Date of Patent: Dec. 13, 2022

(54) IMAGE ENCODING AND DECODING METHOD, APPARATUS, AND SYSTEM, AND STORAGE MEDIUM TO DETERMINE A TRANSFORM CORE PAIR TO EFFECTIVELY REDUCE ENCODING COMPLEXITY

(71) Applicant: HUAWEI TECHNOLOGIES CO., LTD., Shenzhen (CN)

(72) Inventors: Ce Zhu, Chengdu (CN); Shichang Song, Chengdu (CN); Yongbing Lin, Beijing (CN); Jianhua Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/890,779

(22) Filed: Jun. 2, 2020

(65) Prior Publication Data

US 2020/0296422 A1 Sep. 17, 2020

Related U.S. Application Data

(63) Continuation of application No. PCT/CN2018/099255, filed on Aug. 7, 2018.

(30) Foreign Application Priority Data

Dec. 13, 2017 (CN) .................. 201711327990.X

(51) Int. Cl.
*H04N 19/645* (2014.01)
*H04N 19/147* (2014.01)
(Continued)

(52) U.S. Cl.
CPC ......... *H04N 19/645* (2014.11); *H04N 19/147* (2014.11); *H04N 19/176* (2014.11); *H04N 19/45* (2014.11); *H04N 19/649* (2014.11)

(58) Field of Classification Search
CPC ..... H04N 19/645; H04N 19/176; H04N 19/45
See application file for complete search history.

(56) References Cited

U.S. PATENT DOCUMENTS

| 9,674,530 B1* | 6/2017 | Bultje .................. H04N 19/157 |
| 2012/0008675 A1* | 1/2012 | Karczewicz .......... H04N 19/61 |
| | | 375/240.02 |

(Continued)

FOREIGN PATENT DOCUMENTS

| CN | 101098473 A | 1/2008 |
| CN | 101127903 A | 2/2008 |

(Continued)

OTHER PUBLICATIONS

Jianle Chen, Elena Alshina, Gary J. Sullivan, ens-Rainer Ohm, Algorithm Description of Joint Exploration Test Model 6 (JEM 6), Joint Video Exploration Team (JVET) of ITU-T SG 16 WP 3 and ISO/IEC JTC 1/SC 29/WG 11, Doc. JVET-F1001-v2, 6th Meeting: Hobart, AU, Mar. 31-Apr. 7, 2017. total 48 pages.

(Continued)

*Primary Examiner* — Zhubing Ren
(74) *Attorney, Agent, or Firm* — Stein IP, LLC

(57) ABSTRACT

An image encoding and decoding method, includes: determining location information of a target reconstructed image block of a current to-be-encoded image block, where the target reconstructed image block is a reconstructed image block used to determine motion information of the current to-be-encoded image block; determining a first transform core pair based on the location information of the target reconstructed image block; and transforming a residual signal of the current to-be-encoded image block based on the first transform core pair, to obtain a transform coefficient.

11 Claims, 9 Drawing Sheets

(51) Int. Cl.
*H04N 19/176* (2014.01)
*H04N 19/44* (2014.01)
*H04N 19/60* (2014.01)

(56) References Cited

U.S. PATENT DOCUMENTS

| | | | | |
|---|---|---|---|---|
| 2012/0057630 A1* | 3/2012 | Saxena | ............ | H04N 19/61 |
| | | | | 375/240.03 |
| 2013/0003855 A1* | 1/2013 | Park | ............ | H04N 19/70 |
| | | | | 375/240.18 |
| 2015/0124876 A1* | 5/2015 | Lee | ............ | H04N 19/61 |
| | | | | 375/240.12 |
| 2016/0021395 A1* | 1/2016 | Sole | ............ | H04N 19/147 |
| | | | | 375/240.13 |
| 2016/0219290 A1* | 7/2016 | Zhao | ............ | H04N 19/60 |
| 2017/0064298 A1* | 3/2017 | He | ............ | H04N 19/12 |
| 2017/0078672 A1* | 3/2017 | Han | ............ | H04N 19/60 |
| 2018/0249179 A1* | 8/2018 | Han | ............ | H04N 19/60 |
| 2019/0007682 A1* | 1/2019 | Kanoh | ............ | H04N 19/61 |
| 2019/0356915 A1* | 11/2019 | Jang | ............ | H04N 19/176 |

FOREIGN PATENT DOCUMENTS

| CN | 101895756 A | 11/2010 |
|---|---|---|
| CN | 102065298 A | 5/2011 |
| CN | 102202217 A | 9/2011 |
| CN | 102595112 A | 7/2012 |
| CN | 103299642 A | 9/2013 |
| CN | 103347188 A | 10/2013 |
| CN | 103581688 A | 2/2014 |
| CN | 104519368 A | 4/2015 |
| CN | 104702962 A | 6/2015 |
| CN | 105531999 A | 4/2016 |
| CN | 106412601 A | 2/2017 |
| CN | 106464878 A | 2/2017 |
| CN | 107211144 A | 9/2017 |

OTHER PUBLICATIONS

Thibaud Biatek, Victorien Lorcy, Pierrick Philippe, Adaptive Transform Sets for Inter Coding, Joint Video Exploration Team (JVET) of ITU-T SG 16 WP 3 and ISO/IEC JTC 1/SC 29/WG 11, Doc. JVET-D0070, 4th Meeting: Chengdu, CN, Oct. 15-21, 2016. total 7 pages.

V. Lorcy, P. Philippe, Proposed improvements to the Adaptive multiple Core transform, Joint Video Exploration Team (JVET) of ITU-T SG 16 WP 3 and ISO/IEC JTC 1/SC 29/WG 11, Doc. JVET-C0022, 3rd Meeting: Geneva, CH, May 26-Jun. 1, 2016. total 7 pages.

ITU-T H.265(Dec. 2016), Series H: Audiovisual and Multimedia Systems, Infrastructure of audiovisual services Coding of moving video, High efficiency video coding, Dec. 2016. total 664 pages.

\* cited by examiner

IMAGE ENCODING AND DECODING METHOD, APPARATUS, AND SYSTEM, AND STORAGE MEDIUM TO DETERMINE A TRANSFORM CORE PAIR TO EFFECTIVELY REDUCE ENCODING COMPLEXITY

CROSS-REFERENCE TO RELATED APPLICATIONS

This application is a continuation of International Application No. PCT/CN2018/099255, filed on Aug. 7, 2018, which claims priority to Chinese Patent Application No. 201711327990.X, filed on Dec. 13, 2017. The disclosures of the aforementioned applications are hereby incorporated by reference in their entireties.

TECHNICAL FIELD

Aspects of this application relate to image processing technologies, and in particular, to an image encoding and decoding method, apparatus, and system, and a storage medium.

BACKGROUND

A digital video is a video recorded in a digital form. The digital video includes a plurality of frames of digital images. An original video usually includes a relatively large amount of data and is not suitable for storage and transmission, and therefore, efficient video compression coding technologies need to be used to compress the original video. This is an encoding objective on an encoder side.

Specifically, an encoding process of the encoder side is as follows. After receiving the original video, the encoder side divides each frame of an image in the original video into a plurality of current to-be-encoded image blocks; performs intra prediction or inter prediction on the current to-be-encoded image block by using a reference image block (the reference image block is used to provide a reference pixel needed by the current to-be-encoded image block, and the reference pixel is used to predict the current to-be-encoded image block), to obtain a prediction signal of the current to-be-encoded image block; and subtracts the prediction signal from an original signal of the current to-be-encoded image block to obtain a residual signal. After the prediction, an amplitude of the residual signal is far less than that of the original signal. Transform and quantization operations are performed on the residual signal. A transform quantization coefficient is obtained after the transform and quantization, and then the quantization coefficient and other indication information used during encoding are encoded by using an entropy encoding technology, to obtain a bitstream.

The transform is an important step in a video encoding process. A sample value of information is transformed from a current domain to a transform domain according to a transform function in a specified form, and then compression encoding is performed based on a distribution characteristic of the information in the transform domain. A cause of performing the transform is: image or video data usually has a great data correlation in a spatial domain, leading to a large amount of redundant information; and direct encoding requires a very large quantity of bits. However, a data correlation in the transform domain is greatly reduced, and therefore, redundant information during the encoding is reduced, and an amount of data needed for the encoding is also greatly reduced, so that a relatively high compression ratio can be obtained.

Currently, in an inter-frame transform mode, multi-core transform (explicit multiple core transform, EMT) is usually used, and the multi-core transform can be used to remedy a deficiency in a relatively large image residual caused by inaccurate inter prediction. In the prior art, a plurality of cores are usually transformed to form a plurality of transform core pairs. For each inter-frame transform mode, a current to-be-encoded image block is transformed by using each transform core pair, and the encoder side needs to select an optimal transform core pair according to a minimum rate-distortion cost (RDCost) criterion, that is, rate-distortion optimization (RDO) needs to be performed on the current to-be-encoded image block for a plurality of times. In the prior art, the RDO needs to be performed on the current to-be-encoded image block for a plurality of times, resulting in relatively high encoding complexity.

SUMMARY

Aspects of this application provide an image encoding and decoding method, apparatus, and system, and a storage medium, to reduce encoding complexity.

According to a first aspect, this application provides an image encoding method, including: determining location information of a target reconstructed image block of a current to-be-encoded image block, where the target reconstructed image block is a reconstructed image block used to determine motion information of the current to-be-encoded image block; determining a first transform core pair based on the location information of the target reconstructed image block; and transforming a residual signal of the current to-be-encoded image block based on the first transform core pair, to obtain a transform coefficient.

A beneficial effect of this application is as follows. According to the image encoding method provided in this application, an encoder side does not need to try a plurality of transform core pairs, thereby reducing encoding complexity and improving encoding efficiency.

Optionally, before the determining a first transform core pair based on the location information of the target reconstructed image block, the method further includes: obtaining a correspondence between location information of at least one reconstructed image block and at least one transform core pair; and correspondingly, the determining a first transform core pair based on the location information of the target reconstructed image block includes: determining the first transform core pair based on the correspondence and the location information of the target reconstructed image block.

A beneficial effect of this application is as follows. According to the image encoding method provided in this application, the first transform core pair can be effectively determined, and therefore, an encoder side does not need to try a plurality of transform core pairs, thereby reducing encoding complexity.

In an optional manner, the correspondence between location information of at least one reconstructed image block and at least one transform core pair includes a correspondence between a left reconstructed image block of the current to-be-encoded image block and a transform core pair (DST7, DCT2), a correspondence between an upper reconstructed image block of the current to-be-encoded image block and a transform core pair (DCT2, DST7), a correspondence between an upper-right reconstructed image block of the current to-be-encoded image block and a transform core pair (DCT8, DST7), a correspondence between a lower-left reconstructed image block of the current to-be-encoded image block and a transform core pair (DST7, DCT8), and a correspondence between an upper-left reconstructed image block of the current to-be-encoded image block and a transform core pair (DST7, DST7).

Optionally, the correspondence between location information of at least one reconstructed image block and at least one transform core pair further includes a correspondence between another target reconstructed image block and a transform core pair (DCT2, DCT2).

Optionally, the determining the first transform core pair based on the correspondence and the location information of the target reconstructed image block includes: determining at least two second transform core pairs based on the correspondence and the location information of the target reconstructed image block; encoding the current to-be-encoded image block based on each of the at least two second transform core pairs, and determining a rate-distortion cost corresponding to the current to-be-encoded image block obtained after the encoding; and using a second transform core pair corresponding to a minimum rate-distortion cost as the first transform core pair.

A beneficial effect of this application is as follows. According to the image encoding method provided in this application, the first transform core pair can be effectively determined, and therefore, an encoder side does not need to try a plurality of transform core pairs, thereby reducing encoding complexity.

In another optional manner, the correspondence between location information of at least one reconstructed image block and at least one transform core pair includes: a correspondence between a left reconstructed image block of the current to-be-encoded image block and two second transform core pairs (DST7, DST7) and (DST7, DCT8), a correspondence between an upper reconstructed image block of the current to-be-encoded image block and two second transform core pairs (DST7, DST7) and (DCT8, DST7), a correspondence between an upper-right reconstructed image block of the current to-be-encoded image block and two second transform core pairs (DST7, DST7) and (DCT8, DST7), a correspondence between a lower-left reconstructed image block of the current to-be-encoded image block and two second transform core pairs (DST7, DCT8) and (DCT2, DCT8), and a correspondence between an upper-left reconstructed image block of the current to-be-encoded image block and two second transform core pairs (DST7, DST7) and (DCT8, DST7).

Optionally, after the transforming a residual signal of the current to-be-encoded image block based on the first transform core pair, to obtain a transform coefficient, the method further includes: quantizing the transform coefficient to obtain a quantized transform coefficient of the current to-be-encoded image block; and performing entropy encoding on the quantized transform coefficient and auxiliary encoding information of the current to-be-encoded image block to obtain a bitstream, where the auxiliary encoding information includes an identifier of an inter-frame transform mode and indication information, and the indication information is used to indicate an index of the first transform core pair.

A beneficial effect of this application is as follows. An encoder side needs to transmit only 1-bit indication information, for a decoder side to determine the first transform core pair. In the prior art, an encoder side needs to transmit an identifier corresponding to each transform core pair. Taking the H.266 standard as an example, there are five transform core pairs. In this case, the encoder side needs to transmit 3-bit identifier information, for the decoder side to determine the first transform core pair. Therefore, overheads of the encoder side can be reduced by using this method.

According to a second aspect, this application provides an image decoding method, including: performing entropy decoding on a bitstream to obtain a quantized transform coefficient of a current to-be-reconstructed image block, and performing inverse quantization on the quantized transform coefficient to obtain a transform coefficient of the current to-be-reconstructed image block; determining location information of a target reconstructed image block of the current to-be-reconstructed image block, where the target reconstructed image block is a reconstructed image block used to determine motion information of the current to-be-reconstructed image block; determining a first transform core pair based on the location information of the target reconstructed image block; and performing inverse transform on the transform coefficient based on the first transform core pair, to reconstruct the current to-be-reconstructed image block.

A beneficial effect of this application is as follows. According to the image decoding method provided in this application, a decoder side does not need to try a plurality of transform core pairs, thereby reducing decoding complexity and improving decoding efficiency.

Optionally, before the determining a first transform core pair based on the location information of the target reconstructed image block, the method further includes: obtaining a correspondence between location information of at least one reconstructed image block and at least one transform core pair; and correspondingly, the determining a first transform core pair based on the location information of the target reconstructed image block includes: determining the first transform core pair based on the correspondence and the location information of the target reconstructed image block.

A beneficial effect of this application is as follows: According to the image decoding method provided in this application, the first transform core pair can be effectively determined, and therefore, a decoder side does not need to try a plurality of transform core pairs, thereby reducing decoding complexity.

In an optional manner, the correspondence between location information of at least one reconstructed image block and at least one transform core pair includes a correspondence between a left reconstructed image block of the current to-be-reconstructed image block and a transform core pair (DST7, DCT2), a correspondence between an upper reconstructed image block of the current to-be-reconstructed image block and a transform core pair (DCT2, DST7), a correspondence between an upper-right reconstructed image block of the current to-be-reconstructed image block and a transform core pair (DCT8, DST7), a correspondence between a lower-left reconstructed image block of the current to-be-reconstructed image block and a transform core pair (DST7, DCT8), and a correspondence between an upper-left reconstructed image block of the current to-be-reconstructed image block and a transform core pair (DST7, DST7).

Optionally, the correspondence between location information of at least one reconstructed image block and at least one transform core pair further includes a correspondence between another target reconstructed image block and a transform core pair (DCT2, DCT2).

Optionally, the bitstream further carries indication information, and the indication information is used to indicate an index of the first transform core pair; and correspondingly, the determining the first transform core pair based on the correspondence and the location information of the target reconstructed image block includes: determining at least two second transform core pairs based on the correspondence and the location information of the target reconstructed image block; and determining the first transform core pair in the at least two second transform core pairs based on the index of the first transform core pair.

A beneficial effect of this application is as follows. According to the image decoding method provided in this application, the first transform core pair can be effectively determined, and therefore, a decoder side does not need to try a plurality of transform core pairs, thereby reducing decoding complexity. Further, the decoder side does not need to calculate rate-distortion costs separately corresponding to two second transform core pairs, to determine the first transform core pair, but determines the first transform core pair based on the indication information. In this way, decoding complexity is reduced and decoding efficiency is improved.

In another optional manner, the correspondence between location information of at least one reconstructed image block and at least one transform core pair includes: a correspondence between a left reconstructed image block of the current to-be-reconstructed image block and two second transform core pairs (DST7, DST7) and (DST7, DCT8), a correspondence between an upper reconstructed image block of the current to-be-reconstructed image block and two second transform core pairs (DST7, DST7) and (DCT8, DST7), a correspondence between an upper-right reconstructed image block of the current to-be-reconstructed image block and two second transform core pairs (DST7, DST7) and (DCT8, DST7), a correspondence between a lower-left reconstructed image block of the current to-be-reconstructed image block and two second transform core pairs (DST7, DCT8) and (DCT2, DCT8), and a correspondence between an upper-left reconstructed image block of the current to-be-reconstructed image block and two second transform core pairs (DST7, DST7) and (DCT8, DST7).

The following describes an image encoding apparatus. For an implementation principle and a technical effect of the image encoding apparatus, refer to the principle and the technical effect of the method in the first aspect and the optional manners of the first aspect. Details are not described herein.

According to a third aspect, this application provides an image encoding apparatus, including:

a first determining module, configured to determine location information of a target reconstructed image block of a current to-be-encoded image block, where the target reconstructed image block is a reconstructed image block used to determine motion information of the current to-be-encoded image block;

a second determining module, configured to determine a first transform core pair based on the location information of the target reconstructed image block; and a transform module, configured to transform a residual signal of the current to-be-encoded image block based on the first transform core pair, to obtain a transform coefficient.

Optionally, the apparatus further includes an obtaining module, configured to obtain a correspondence between location information of at least one reconstructed image block and at least one transform core pair. Correspondingly, the second determining module is configured to determine the first transform core pair based on the correspondence and the location information of the target reconstructed image block.

Optionally, the second determining module is configured to: determine at least two second transform core pairs based on the correspondence and the location information of the target reconstructed image block; encode the current to-be-encoded image block based on each of the at least two second transform core pairs, and determine a rate-distortion cost corresponding to the current to-be-encoded image block obtained after the encoding; and use a second transform core pair corresponding to a minimum rate-distortion cost as the first transform core pair.

Optionally, the apparatus further includes:

a quantization module, configured to quantize the transform coefficient to obtain a quantized transform coefficient of the current to-be-encoded image block; and an entropy encoding module, configured to perform entropy encoding on the quantized transform coefficient and auxiliary encoding information of the current to-be-encoded image block to obtain a bitstream, where the auxiliary encoding information includes an identifier of an inter-frame transform mode and indication information, and the indication information is used to indicate an index of the first transform core pair.

The following describes an image decoding apparatus. For an implementation principle and a technical effect of the image decoding apparatus, refer to the principle and the technical effect of the method in the second aspect and the optional manners of the second aspect. Details are not described herein.

According to a fourth aspect, this application provides an image decoding apparatus, including:

an entropy decoding module, configured to perform entropy decoding on a bitstream to obtain a quantized transform coefficient of a current to-be-reconstructed image block;

an inverse quantization module, configured to perform inverse quantization on the quantized transform coefficient to obtain a transform coefficient of the current to-be-reconstructed image block;

a first determining module, configured to determine location information of a target reconstructed image block of the current to-be-reconstructed image block, where the target reconstructed image block is a reconstructed image block used to determine motion information of the current to-be-reconstructed image block;

a second determining module, configured to determine a first transform core pair based on the location information of the target reconstructed image block; and an inverse transform module, configured to perform inverse transform on the transform coefficient based on the first transform core pair, to reconstruct the current to-be-reconstructed image block.

Optionally, the apparatus further includes an obtaining module, configured to obtain a correspondence between location information of at least one reconstructed image block and at least one transform core pair. Correspondingly, the second determining module is configured to determine the first transform core pair based on the correspondence and the location information of the target reconstructed image block.

Optionally, the bitstream further carries indication information, and the indication information is used to indicate an index of the first transform core pair. Correspondingly, the second determining module is configured to: determine at least two second transform core pairs based on the correspondence and the location information of the target reconstructed image block; and determine the first transform core pair in the at least two second transform core pairs based on the index of the first transform core pair.

According to a fifth aspect, this application provides an image encoding and decoding system, including the image encoding apparatus in any one of the third aspect and the optional manners of the third aspect, and the image decoding apparatus in any one of the fourth aspect and the optional manners of the fourth aspect.

According to a sixth aspect, this application provides a storage medium, including an instruction. When the instruction is run on an image encoding apparatus, the image encoding apparatus is enabled to perform the method in any one of the first aspect and the optional manners of the first aspect.

According to a seventh aspect, this application provides a storage medium, including an instruction. When the instruction is run on an image decoding apparatus, the image decoding apparatus is enabled to perform the method in any one of the second aspect and the optional manners of the second aspect.

According to an eighth aspect, this application provides a computer program product. When the computer program product is run on an image encoding apparatus, the image encoding apparatus is enabled to perform the image encoding method in any one of the first aspect and the optional manners of the first aspect.

According to a ninth aspect, this application provides a computer program product. When the computer program product is run on an image decoding apparatus, the image decoding apparatus is enabled to perform the image decoding method in any one of the second aspect and the optional manners of the second aspect.

This application provides an image encoding and decoding method, apparatus, and system, and a storage medium. The method includes: determining location information of a target reconstructed image block of a current to-be-encoded image block, where the target reconstructed image block is a reconstructed image block used to determine motion information of the current to-be-encoded image block; determining a first transform core pair based on the location information of the target reconstructed image block; and transforming a residual signal of the current to-be-encoded image block based on the first transform core pair, to obtain a transform coefficient. In this way, an encoder side does not need to try a plurality of transform core pairs, thereby reducing encoding complexity and improving encoding efficiency.

DESCRIPTION OF EMBODIMENTS

Figure 1:
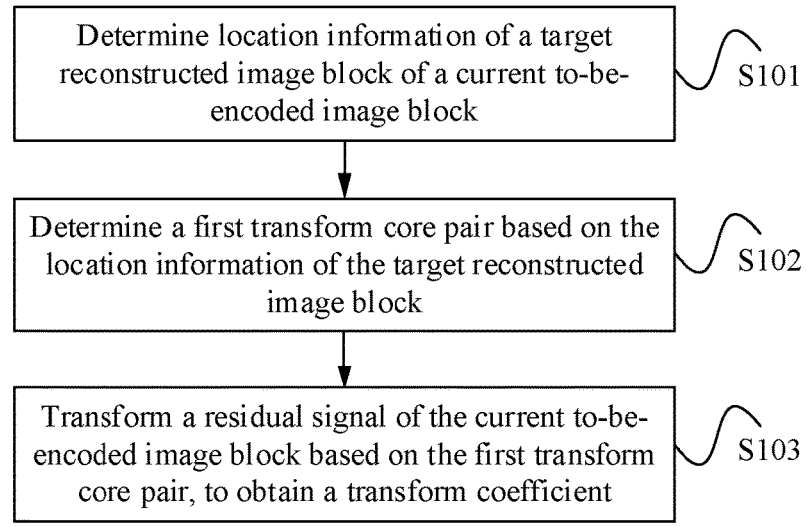
FIG. 1 is a flowchart of an image encoding method according to an embodiment of this application.

The following describes some terms in this application, to facilitate understanding of a person skilled in the art.

A digital video is a video recorded in a digital form. The digital video includes a plurality of frames of digital images. An original video usually includes a relatively large amount of data and is not suitable for storage and transmission. Therefore, efficient video compression coding technologies need to be used to compress the original video.

An RDO method is an optimization method for improving video compression performance. A principle of the RDO method is: simultaneously optimizing loss (picture quality) in a video and a bit rate (a data amount needed for encoding), to achieve an optimal balance. This algorithm is initially used in an encoder for video compression, but can also be used to encode multimedia including a video, audio, and the like, provided that both quality and a file size are considered during the encoding.

In a video compression technology, compression is implemented by eliminating video redundancy. The video redundancy mainly includes spatial redundancy, temporal redundancy, visual redundancy, and information entropy redundancy.

The spatial redundancy is main data redundancy in a static image. The spatial redundancy means that adjacent pixels in an image have relatively approximate amplitudes, and this spatial continuity is referred to as a spatial correlation or spatial redundancy. The spatial redundancy is mainly eliminated by using an intra prediction method. The intra prediction method means that a pixel in a current reconstructed image block is predicted through a video spatial domain correlation by using a pixel in a reference image block, to eliminate video spatial redundancy.

The temporal redundancy is redundancy that usually occurs in a video sequence. Adjacent images of a video usually include a same background or similar backgrounds and moving objects, but the moving objects are in slightly different spatial locations. Such a high data correlation between adjacent images is referred to as the temporal redundancy. The temporal redundancy is mainly eliminated by using an inter prediction technology. The inter prediction technology means that a current pixel is predicted by using a pixel in a temporally adjacent image.

The visual redundancy means that a human visual system is insensitive to a specific change of an image. Even if information about the specific change is lost, human eyes cannot sense the loss. When original video data is recorded, it is usually assumed that the visual system is consistently sensitive to various types of content, and consequently, more data than that during ideal encoding is generated. This is referred to as the visual redundancy. The visual redundancy is mainly eliminated by using a transform technology and a quantization technology. The transform technology means that an image signal is transformed to a frequency domain for processing, and data expression and bit reallocation are performed based on a magnitude of contribution made by different frequency signals to visual quality. This can correct an improper expression of uniform sampling in a spatial domain. In addition, in a bit reallocation process, a requirement for eliminating the visual redundancy is considered, and an excessively fine expression of a high frequency component is omitted by using a quantization operation, to implement effective compression.

The information entropy redundancy means that it can be learned from an information theory that a pixel of image data is represented by allocating a corresponding quantity of bits based on an information entropy size of the pixel. However, for each pixel of the image data, it is extremely difficult to obtain an information entropy of the pixel during image obtaining. Therefore, all pixels are usually represented by using a same quantity of bits, and consequently, redundancy is inevitably caused. The information entropy redundancy is mainly eliminated by using an entropy encoding technology. The entropy encoding technology allocates different quantities of bits to data with different information entropies by collecting statistics about information entropy distribution of a coefficient.

A currently mainstream video compression coding architecture is a hybrid encoding architecture. The foregoing types of redundancy are eliminated by using different technologies, and these technologies are combined to form a hybrid video coding architecture. After receiving an original video, an encoder side divides each frame of image in the original video into current to-be-encoded image blocks; predicts a current to-be-encoded image block by using a reference image block, to obtain a prediction signal of the current to-be-encoded image block; and subtracts the prediction signal from an original signal of the current to-be-encoded image block to obtain a residual signal. After the prediction, an amplitude of the residual signal is far less than that of the original signal. Transform and quantization operations are performed on the residual signal. A transform quantization coefficient is obtained after the transform and quantization, and then the quantization coefficient and other indication information used during encoding are encoded by using an entropy encoding technology, to obtain a bitstream.

After obtaining the bitstream, a decoder side first performs entropy decoding on the bitstream to obtain a transform quantization coefficient of a current to-be-reconstructed image block, and then performs inverse quantization and inverse transform on the transform quantization coefficient to obtain a reconstructed residual signal of the current to-be-reconstructed image block. The current to-be-reconstructed image block is predicted by using a reference image block, to obtain a prediction signal of the current to-be-reconstructed image block, the prediction signal is added to the reconstructed residual signal to obtain a reconstruction signal of the current to-be-reconstructed image block, and then a reconstructed image block corresponding to the current to-be-reconstructed image block is obtained based on the reconstruction signal.

The encoder side may generate the prediction signal of the current to-be-encoded image block by using an intra-frame prediction technology or an inter prediction technology. In the prior art, an inter prediction process is as follows. The encoder side determines a target reconstructed image block for each inter-frame transform mode, and uses motion information of the target reconstructed image block as motion information of a to-be-encoded reconstructed image block. The motion information includes an index of a reference image frame in which the target reconstructed image block is located, and a spatial displacement, namely, a motion vector, between the target reconstructed image block and a reference image block of the target reconstructed image block. The encoder side performs motion compensation on an image block at a corresponding location in an image frame before the current to-be-encoded image block based on the motion information, to obtain a prediction signal of the encoder side. For some inter prediction modes, the encoder side searches each reference image frame to determine a reconstructed image block with a minimum rate-distortion encoding cost as the target reconstructed image block. For some other inter prediction modes, for example, a merge mode, the encoder side does not need to continuously search each reference image frame, but determines the target reconstructed image block according to a criterion in an upper-left reconstructed image block, an upper reconstructed image block, an upper-right reconstructed image block, a left reconstructed image block, and a lower-left reconstructed image block of the current to-be-encoded image block.

As described above, after the prediction signal of the current to-be-encoded image block is obtained, the residual signal is obtained based on the prediction signal and the original signal of the current to-be-encoded image block. Then, transform, quantization, and entropy encoding are performed on the residual signal to obtain the bitstream. In the prior art, a plurality of cores are usually transformed to form a plurality of transform core pairs. For example, the H.266 video encoding standard includes a plurality of transform core pairs including DST1, DST2, DCT5, DST7, and DCT8, and each transform core pair includes a horizontal transform core and a vertical transform core. For each inter-frame transform mode, the current to-be-encoded image block is transformed by using each transform core pair, and the encoder side needs to select an optimal transform core pair according to a minimum rate-distortion cost criterion, that is, RDO needs to be performed on the current to-be-encoded image block. In the prior art, RDO needs to be performed on the current to-be-encoded image block for a plurality of times, resulting in relatively high encoding complexity.

To resolve the foregoing and/or other technical problems, aspects of this application provides an image encoding and decoding method, apparatus, and system, and a storage medium. Specifically, FIG. 1 is a flowchart of an image encoding method according to an embodiment of this application. As shown in FIG. 1, the method includes the following steps:

Step S101: Determine location information of a target reconstructed image block of a current to-be-encoded image block.

Step S102: Determine a first transform core pair based on the location information of the target reconstructed image block.

Step S103: Transform a residual signal of the current to-be-encoded image block based on the first transform core pair, to obtain a transform coefficient.

Description is provided for step S101: An inter-frame transform mode used by an encoder side may be a merge mode, a template matching (TM) mode, an advanced motion vector prediction (AMVP) mode, or the like.

The target reconstructed image block is a reconstructed image block used to determine motion information of the current to-be-encoded image block. Optionally, motion information of the target reconstructed image block may be used as the motion information of the current to-be-encoded image block. The motion information includes an index of a reference image frame in which the target reconstructed image block is located, and a spatial displacement, namely, a motion vector, between the target reconstructed image block and a reference image block of the target reconstructed image block. The encoder side may perform motion compensation on an image block at a corresponding location in an image frame before the current to-be-encoded image block based on the motion information, to obtain a prediction signal of the encoder side. Further, the encoder side may determine the location information of the target reconstructed image block.

Figure 2:
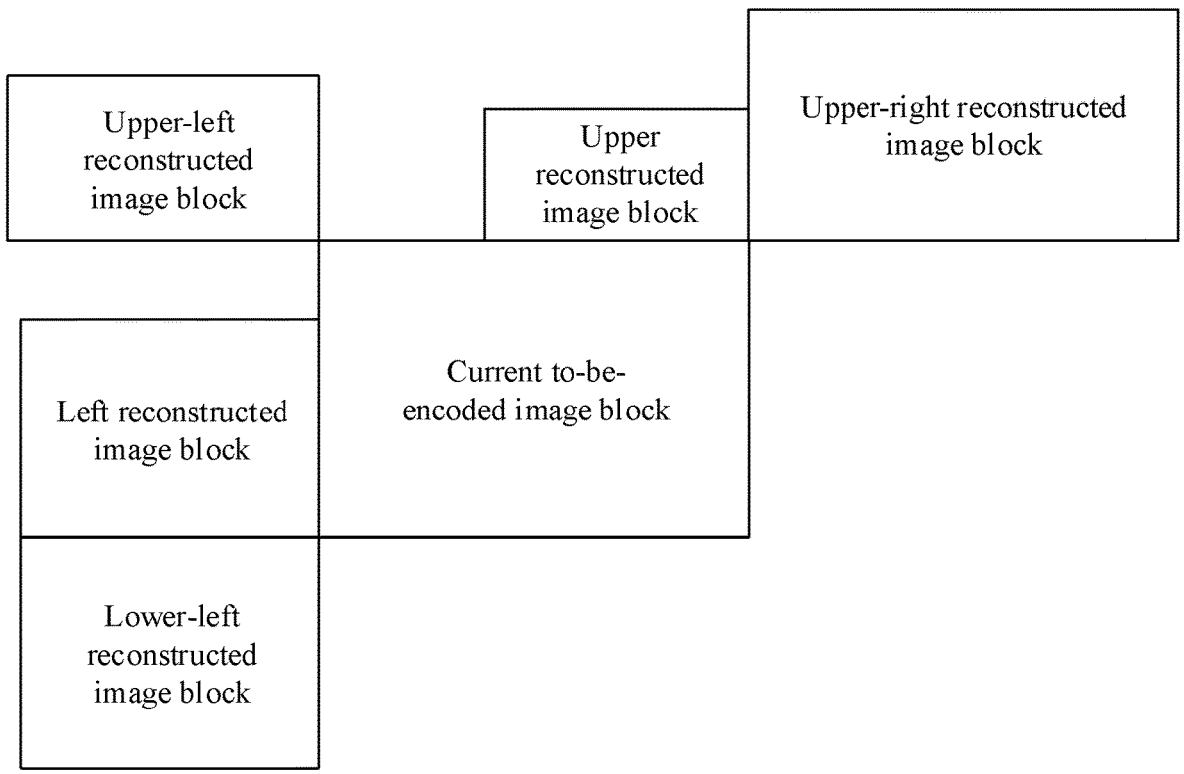
FIG. 2 is a schematic diagram of a location of a target reconstructed image block according to an embodiment of this application.
Figure 3A:
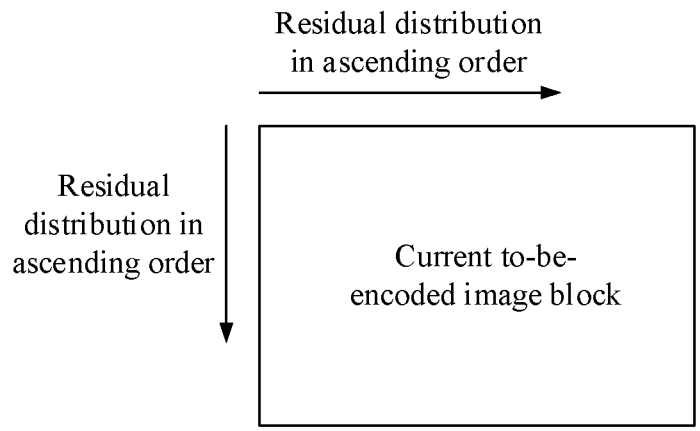
FIG. 3A to FIG. 3E are schematic diagrams of residual distribution of a current to-be-encoded image block according to an embodiment of this application.
Figure 3B:
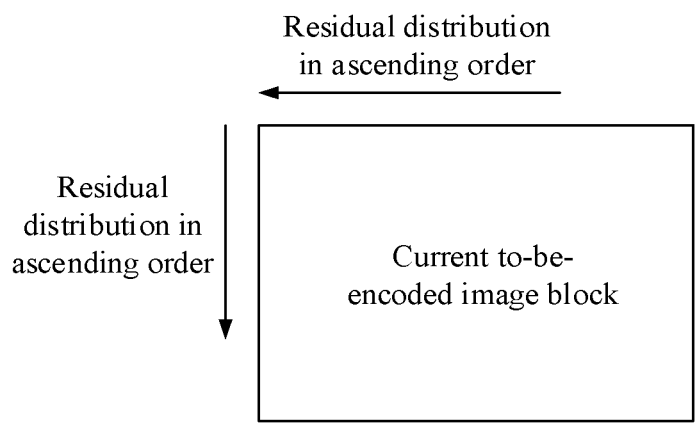
Figure 3C:
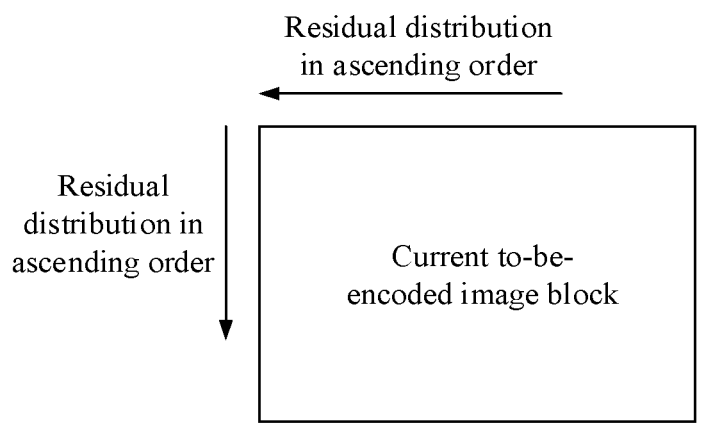
Figure 3D:
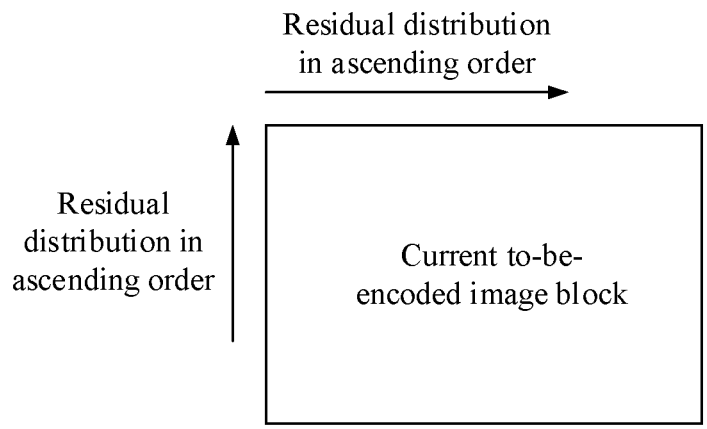
Figure 3E:
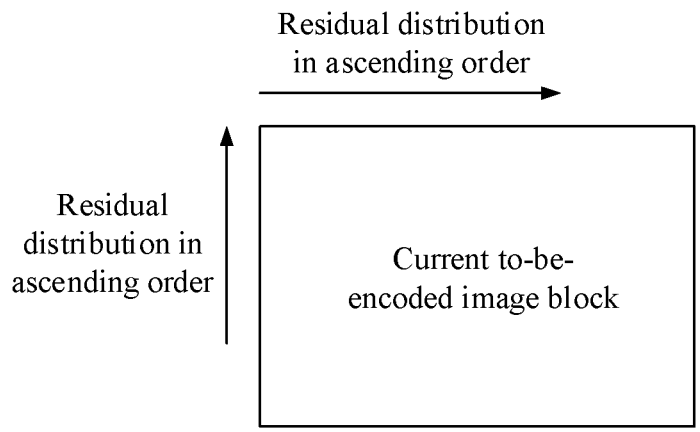

A location of the target reconstructed image block is shown below. FIG. 2 is a schematic diagram of the location of the target reconstructed image block according to an embodiment of this application. As shown in FIG. 2, the target reconstructed image block of the current to-be-encoded image block may be located on the upper left, the upper, the upper right, the left, the lower left of the current to-be-encoded image block. This application imposes no limitation on the location of the target reconstructed image block. Further, when the location of the target reconstructed image block varies, the reference image block determined by the encoder side based on the target reconstructed image block also varies. Because the reference image block is used to generate a prediction signal of the current to-be-encoded image block, the residual signal that is of the current to-be-encoded image block and that is generated by the encoder side also varies, that is, residual distribution of the current to-be-encoded image block varies. Specifically, FIG. 3A to FIG. 3E are schematic diagrams of residual distribution of a current to-be-encoded image block according to an embodiment of this application. As shown in FIG. 3A, if the target reconstructed image block is located on the upper left of the current to-be-encoded image block, an upper-left pixel included in the current to-be-encoded image block has a motion consistency with the target reconstructed image block. Therefore, the encoder side predicts the upper-left pixel included in the current to-be-encoded image block more accurately, that is, a residual is relatively small. Based on this, a residual of the current to-be-encoded image block increases along a direction pointed by an arrow. As shown in FIG. 3B, if the target reconstructed image block is located on the upper of the current to-be-encoded image block, an upper pixel included in the current to-be-encoded image block has a motion consistency with the target reconstructed image block. Therefore, the encoder side predicts the upper pixel included in the current to-be-encoded image block more accurately, that is, a residual is relatively small. Based on this, a residual of the current to-be-encoded image block increases along a direction pointed by an arrow. As shown in FIG. 3C, if the target reconstructed image block is located on the upper right of the current to-be-encoded image block, an upper-right pixel included in the current to-be-encoded image block has a motion consistency with the target reconstructed image block. Therefore, the encoder side predicts the upper-right pixel included in the current to-be-encoded image block more accurately, that is, a residual is relatively small. Based on this, a residual of the current to-be-encoded image block increases along a direction pointed by an arrow. As shown in FIG. 3D, if the target reconstructed image block is located on the left of the current to-be-encoded image block, a left pixel included in the current to-be-encoded image block has a motion consistency with the target reconstructed image block. Therefore, the encoder side predicts the left pixel included in the current to-be-encoded image block more accurately, that is, a residual is relatively small. Based on this, a residual of the current to-be-encoded image block increases along a direction pointed by an arrow. As shown in FIG. 3E, if the target reconstructed image block is located on the lower left of the current to-be-encoded image block, a lower-left pixel included in the current to-be-encoded image block has a motion consistency with the target reconstructed image block. Therefore, the encoder side predicts the lower-left pixel included in the current to-be-encoded image block more accurately, that is, a residual is relatively small. Based on this, a residual of the current to-be-encoded image block increases along a direction pointed by an arrow.

Description is provided for step S102: Before step S102, the encoder side may obtain a correspondence between location information of at least one reconstructed image block and at least one transform core pair. Based on this, step S102 specifically includes: determining the first transform core pair based on the correspondence and the location information of the target reconstructed image block.

In one case, the encoder side may directly determine the first transform core pair based on the correspondence and the location information of the target reconstructed image block. Taking the merge mode as an example, the correspondence between location information of at least one reconstructed image block and at least one transform core pair is shown in Table 1. The correspondence includes a correspondence between the location information of the target reconstructed image block and the first transform core pair. The correspondence shown in Table 1 is determined based on the residual distribution of the current to-be-encoded image block and a characteristic of a transform core pair. For example, DCT2 is more applicable to an image block whose residual distribution is even, and DST7 is more applicable to an image block whose residual distribution gradually increases from left to right in a horizontal direction. It should be noted that a correspondence between a plurality of pieces of location information and a plurality of transform core pairs in this application is not limited to content shown in Table 1.

TABLE 1

| Location of a reconstructed image block | Horizontal transform core | Vertical transform core | Size of a current to-be-encoded image block (optional column) |
|---|---|---|---|
| Left | DST7 | DCT2 | A width of the current to-be-encoded image block is less than or equal to 16 |
| Upper | DCT2 | DST7 | A height of the current to-be-encoded image block is less than or equal to 16 |
| Upper right | DCT8 | DST7 | A width of the current to-be-encoded image block is less than or equal to 16, and a height of the current to-be-encoded image block is less than or equal to 16 |
| Lower left | DST7 | DCT8 | A width of the current to-be-encoded image block is less than or equal to 16, and a height of the current to-be-encoded image block is less than or equal to 16 |

TABLE 1-continued

| Location of a reconstructed image block | Horizontal transform core | Vertical transform core | Size of a current to-be-encoded image block (optional column) |
|---|---|---|---|
| Upper left | DST7 | DST7 | A width of the current to-be-encoded image block is less than or equal to 16, and a height of the current to-be-encoded image block is less than or equal to 16 |
| Another location | DCT2 | DCT2 | A width of the current to-be-encoded image block is less than or equal to 16, and a height of the current to-be-encoded image block is less than or equal to 16 |

Based on this, step S102 may be implemented through a table lookup. For example, when the target reconstructed image block is located on the left of the current to-be-encoded image block, the determined first transform core pair is (DST7, DCT2); when the target reconstructed image block is located on the upper of the current to-be-encoded image block, the determined first transform core pair is (DCT2, DST7); when the target reconstructed image block is located on the upper right of the current to-be-encoded image block, the determined first transform core pair is (DCT8, DST7); when the target reconstructed image block is located on the lower left of the current to-be-encoded image block, the determined first transform core pair is (DST7, DCT8); and when the target reconstructed image block is located on the upper left of the current to-be-encoded image block, the determined first transform core pair is (DST7, DST7).

Figure 4:
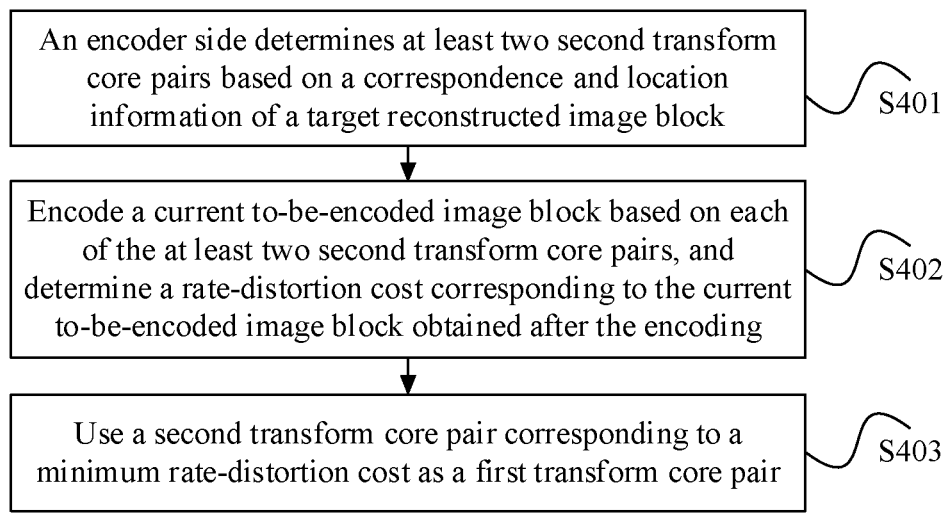
FIG. 4 is a flowchart of a method for determining a first transform core pair according to another embodiment of this application.

In another case, the encoder side may indirectly determine the first transform core pair based on the correspondence and the location information of the target reconstructed image block. Specifically, FIG. 4 is a flowchart of a method for determining a first transform core pair according to another embodiment of this application. As shown in FIG. 4, the method includes the following procedure:

Step S401: The encoder side determines at least two second transform core pairs based on the correspondence and the location information of the target reconstructed image block.

Step S402: Encode the current to-be-encoded image block based on each of the at least two second transform core pairs, and determine a rate-distortion cost corresponding to the current to-be-encoded image block obtained after the encoding.

Step S403: Use a second transform core pair corresponding to a minimum rate-distortion cost as the first transform core pair.

Specifically, taking the merge mode as an example, a correspondence between at least one piece of location information of a reconstructed image block and at least one transform core pair is shown in Table 2. The correspondence includes a correspondence between the location information of the target reconstructed image block and two second transform core pairs. The correspondence shown in Table 2 is determined based on the residual distribution of the current to-be-encoded image block and a characteristic of a transform core pair. For example, DCT2 is more applicable to an image block whose residual distribution is even, and DST7 is more applicable to an image block whose residual distribution gradually increases from left to right in a horizontal direction. It should be noted that a correspondence between a plurality of pieces of location information and a plurality of transform core pairs in this application is not limited to content shown in Table 2.

TABLE 2

| Location of a reconstructed image block | Second transform core pairs | Size of a current to-be-encoded image block (optional column) |
|---|---|---|
| Left | (DST7, DST7) and (DST7, DCT8) | A width of the current to-be-encoded image block is less than or equal to 64, and a height of the current to-be-encoded image block is less than or equal to 64 |
| Upper | (DST7, DST7) and (DCT8, DST7) | A width of the current to-be-encoded image block is less than or equal to 64, and a height of the current to-be-encoded image block is less than or equal to 64 |
| Upper right | (DST7, DST7) and (DCT8, DST7) | A width of the current to-be-encoded image block is less than or equal to 64, and a height of the current to-be-encoded image block is less than or equal to 64 |
| Lower left | (DST7, DCT8) and (DCT2, DCT8) | A width of the current to-be-encoded image block is less than or equal to 64, and a height of the current to-be-encoded image block is less than or equal to 64 |
| Upper left | (DST7, DST7) and (DCT8, DST7) | A width of the current to-be-encoded image block is less than or equal to 64, and a height of the current to-be-encoded image block is less than or equal to 64 |
| Another location | (DST7, DST7) and (DCT2, DCT2) | A width of the current to-be-encoded image block is less than or equal to 64, and a height of the current to-be-encoded image block is less than or equal to 64 |

Based on this, step S102 may be implemented through a table lookup. For example, when the target reconstructed image block is located on the left of the current to-be-encoded image block, the determined two second transform core pairs are (DST7, DST7) and (DST7, DCT8); when the target reconstructed image block is located on the upper of the current to-be-encoded image block, the determined two second transform core pairs are (DST7, DST7), (DCT8, DST7); when the target reconstructed image block is located on the upper right of the current to-be-encoded image block, the determined two second transform core pairs are (DST7, DST7) and (DCT8, DST7); when the target reconstructed image block is located on the lower left of the current to-be-encoded image block, the determined two second transform core pairs are (DST7, DCT8) and (DCT2, DCT8); and when the target reconstructed image block is located on the upper left of the current to-be-encoded image block, the determined two second transform core pairs are (DST7, DST7) and (DCT8, DST7). A first item in each transform core pair represents a transform core in a horizontal direction, and a second item represents a transform core in a vertical direction.

Further, after the encoder side determines two transform core pairs, the encoder side calculates the rate-distortion cost corresponding to the current to-be-encoded image block by using a rate-distortion method, and selects a transform core pair with a minimum rate-distortion cost as the first transform core pair.

Figure 5:
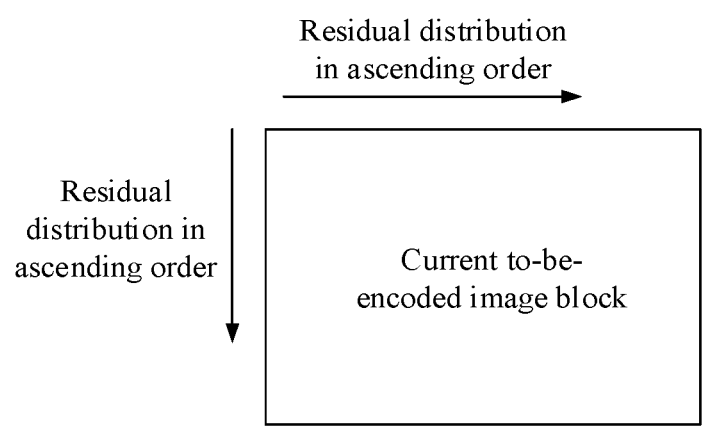
FIG. 5 is a schematic diagram of residual distribution of a current to-be-encoded image block according to an embodiment of this application.

Then taking the TM mode as an example, FIG. 5 is a schematic diagram of residual distribution of a current to-be-encoded image block according to an embodiment of this application. As shown in FIG. 5, an upper reconstructed image block (which may be understood as a target reconstructed image block) and a left reconstructed image block (which may be understood as a target reconstructed image block) of the current to-be-encoded image block form an inverted "L" template, and the encoder side may determine the motion information of the current to-be-encoded image block by using the "L" template. Further, the encoder side may obtain a reference image block of the current to-be-encoded image block based on the motion information. The reference image block is used to generate a prediction signal of the to-be-encoded image block. Based on this, a pixel closer to the "L" template in the current to-be-encoded image block has a smaller residual, and on the contrary, a pixel farther away from the "L" template has a larger residual. Based on this characteristic, in the TM mode, the current to-be-encoded image block may correspond to two second transform core pairs: (DCT2, DCT2) and (DST7, DST7). In this case, a corresponding rate-distortion cost of the current to-be-encoded image block in each transform core pair may be calculated, and finally, a transform core pair with a smaller rate-distortion cost is used as the first transform core pair. In this application, content and a quantity of second transform core pairs corresponding to the current to-be-encoded image block are not limited.

In step S103, if there is only one inter-frame transform mode, the encoder side directly uses the first transform core pair as an optimal transform core pair, and encodes the current to-be-encoded image block by using the first transform core pair. If there are a plurality of inter-frame transform modes, because the encoder side has determined a corresponding first transform core pair for each inter-frame transform mode, a transform core pair corresponding to a minimum rate-distortion cost is finally selected from these first transform core pairs as an optimal transform core pair, and the current to-be-encoded image block is encoded by using the optimal transform core pair.

It should be noted that the first transform core pair may not be determined based on the location information of the target reconstructed image block in all inter-frame transform modes. For those inter-frame transform modes in which the first transform core pair cannot be determined based on the location information of the target reconstructed image block, a method in the prior art may be used, that is, each transform core pair is tried to determine a transform core pair corresponding to a minimum rate-distortion cost as the first transform core pair. Alternatively, at least one transform core pair such as (DCT2, DCT2) may be used by default.

Further, the current to-be-encoded image block may be transformed in an existing transform manner. Details are not described in this application.

In view of the above, this application provides an image encoding method, including: determining location information of a target reconstructed image block of a current to-be-encoded image block in an inter-frame transform mode; determining a first transform core pair based on the location information of the target reconstructed image block; and transforming a residual signal of the current to-be-encoded image block based on the first transform core pair. In this way, an encoder side does not need to try a plurality of transform core pairs, thereby reducing encoding complexity and improving encoding efficiency.

Figure 6:
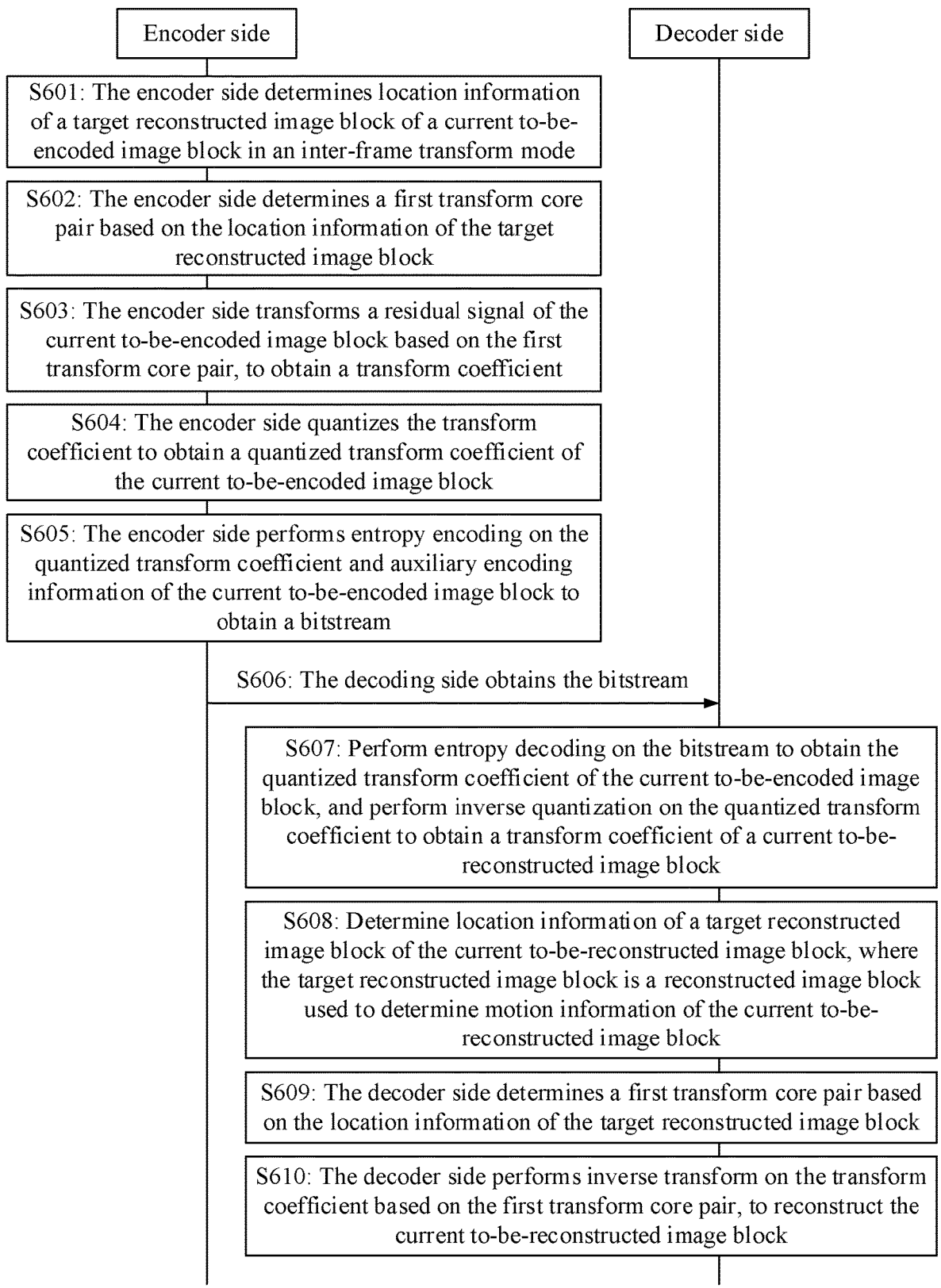
FIG. 6 is an interaction flowchart of an image encoding and decoding method according to an embodiment of this application.

Further, after the residual signal of the current to-be-encoded image block is transformed, the encoder side may further quantize a transform coefficient of the current to-be-encoded image block to obtain a quantized transform coefficient. The coefficient is also referred to as a transform quantization coefficient or a quantization coefficient. Further, the encoder side performs entropy encoding on the quantized transform coefficient and auxiliary encoding information to obtain a corresponding bitstream. Specifically, FIG. 6 is an interaction flowchart of an image encoding and decoding method according to an embodiment of this application. As shown in FIG. 6, the method further includes the following steps.

Step S601: An encoder side determines location information of a target reconstructed image block of a current to-be-encoded image block in an inter-frame transform mode.

Step S602: The encoder side determines a first transform core pair based on the location information of the target reconstructed image block.

Step S603: The encoder side transforms a residual signal of the current to-be-encoded image block based on the first transform core pair, to obtain a transform coefficient.

Step S601 to step S603 are the same as step S101 to step S103. For explanations and descriptions of step S601 to step S603, refer to the explanations and descriptions of step S101 to step S103. Details are not described in this application.

Step S604: The encoder side quantizes the transform coefficient to obtain a quantized transform coefficient of the current to-be-encoded image block.

Step S605: The encoder side performs entropy encoding on the quantized transform coefficient and auxiliary encoding information of the current to-be-encoded image block to obtain a bitstream.

Step S606: A decoder side obtains the bitstream.

Step S607: Perform entropy decoding on the bitstream to obtain the quantized transform coefficient of the current to-be-encoded image block, and perform inverse quantization on the quantized transform coefficient to obtain a transform coefficient of a current to-be-reconstructed image block.

Step S608: Determine location information of a target reconstructed image block of the current to-be-reconstructed image block, where the target reconstructed image block is a reconstructed image block used to determine motion information of the current to-be-reconstructed image block.

Step S609: The decoder side determines a first transform core pair based on the location information of the target reconstructed image block.

Step S610: The decoder side performs inverse transform on the transform coefficient based on the first transform core pair, to reconstruct the current to-be-reconstructed image block.

Description is provided for step S604: A quantization process is a process in which forcible planning is performed, so that an input value with a relatively large dynamic range is replaced with a relatively small quantity of output values. A quantization input value has a relatively large range, and therefore needs to be represented by using a relatively large quantity of bits. In contrast, an output value obtained after the "forcible planning" has a relatively small range, and therefore needs to be represented by using only a small quantity of bits. Each quantization input is normalized to one quantization output. In other words, each quantization input is quantized to a specific order of magnitude, and the order of magnitude is usually referred to as a quantization level (which is usually specified by an encoder side). An existing quantization technology is used in the quantization process mentioned in this application. Details are not described in this application.

Description is provided for step S605: The auxiliary encoding information of the current to-be-encoded image block in this application is all information except the quantized transform coefficient of the current to-be-encoded image block in an entropy encoding process, for example, includes an identifier of an inter-frame transform mode and indication information (optional). The indication information is used to indicate an index of the first transform core pair. The auxiliary encoding information may further include data of the current to-be-encoded image block and associated data. The associated data may include a Sequence Parameter Set (SPS), a Picture Parameter Set (PPS), and another syntax structure. The SPS may include parameters applied to zero or a plurality of sequences. The PPS may include parameters applied to zero or a plurality of pictures. The syntax structure is a set of zero or a plurality of syntactic elements arranged in a specified order in a bitstream. Further, the auxiliary encoding information may further include an encoding mode of the current to-be-encoded image block, block division information of the current to-be-encoded image block, other indication information of the current to-be-encoded image block, and the like. An existing entropy encoding technology may be used in the entropy encoding process mentioned in this application. Details are not described in this application.

It should be noted that, in this application, both the encoder side and the decoder side may obtain the correspondence shown in Table 1 or Table 2. Because quantities of transform core pairs included in the correspondences shown in Table 1 and Table 2 are different, content carried in the auxiliary encoding information is also different. Details are as follows:

In an optional manner 1, if an inter-frame transform mode finally used by the encoder side during encoding is a mode in which the first transform core pair may be determined by using the location information of the target reconstructed image block, and a correspondence in the inter-frame transform mode is shown in Table 1, that is, one location corresponds to one transform core pair, the auxiliary encoding information carries identifier information of the inter-frame transform mode finally determined by the encoder side.

Based on this, description is provided with reference to step S607 to step S609: A method in the prior art may be used in an entropy decoding process and an inverse quantization process at the decoder side. Details are not described in this application. The decoder side only needs to learn of identifier information of an inter-frame transform mode, and may determine the corresponding inter-frame transform mode and the correspondence shown in Table 1 based on the identifier information. In addition, the decoder side may further reconstruct the current to-be-reconstructed image block based on the bitstream. The current to-be-reconstructed image block corresponds to the current to-be-encoded image block, that is, after the current to-be-reconstructed image block is reconstructed, an original image block (which usually has a residual) of the current to-be-encoded image block is obtained. The decoder side may learn of the target reconstructed image block of the current to-be-reconstructed image block by using a same rule as the encoder side. Motion information of the target reconstructed image block may be used as motion information of the current to-be-reconstructed image block, a reference image block of the current to-be-reconstructed image block may be obtained by using the motion information, and the reference image block is used to generate a prediction signal of the current to-be-reconstructed image block. That "the decoder side may learn of the target reconstructed image block of the current to-be-reconstructed image block by using a same rule as the encoder side" means that if the target reconstructed image block determined by the encoder side is an upper-left reconstructed image block of the current to-be-encoded image block, the target reconstructed image block determined by the decoder side is also an upper-left reconstructed image block of the current to-be-reconstructed image block. Based on this, after the decoder side obtains the target reconstructed image block, the decoder side may determine the location information of the target reconstructed image block. The first transform core pair is determined by looking up Table 1.

A beneficial effect is as follows. The encoder side does not need to transmit any indication information, for the decoder side to determine the first transform core pair. However, in the prior art, the encoder side needs to transmit an identifier corresponding to each transform core pair. Taking the H.266 standard as an example, it is assumed that there are five transform core pairs. In this case, the encoder side needs to transmit 3-bit identifier information, for the decoder side to determine the first transform core pair. Therefore, overheads of the encoder side can be reduced by using this method.

In an optional manner 2, if an inter-frame transform mode finally used by the encoder side during encoding is a mode in which the first transform core pair may be determined by using the location information of the target reconstructed image block, and a correspondence in the inter-frame transform mode is shown in Table 2, that is, one location corresponds to two transform core pairs, the auxiliary encoding information carries identifier information of the inter-frame transform mode finally determined by the encoder side and indication information. The indication information is used to indicate an index of the first transform core pair. For example, the index is 1 or 2. When the index is 1, it indicates that when the decoder side determines two second transform core pairs, the decoder side finally selects the first one of the two second transform core pairs as the first transform core pair. When the index is 2, it indicates that when the decoder side determines two second transform core pairs, the decoder side finally selects the second one of the two second transform core pairs as the first transform core pair.

Based on this, description is provided with reference to step S607 to step S609: A method in the prior art may be used in an entropy decoding process and an inverse quantization process at the decoder side. Details are not described in this application. The decoder side needs to learn of identifier information of an inter-frame transform mode and indication information, and may determine the corresponding inter-frame transform mode and the correspondence shown in Table 2 based on the identifier information. In addition, the decoder side may further reconstruct the current to-be-reconstructed image block based on the bitstream. The decoder side may learn of the target reconstructed image block of the current to-be-reconstructed image block by using a same rule as the encoder side. Motion information of the target reconstructed image block may be used as motion information of the current to-be-reconstructed image block, a reference image block of the current to-be-reconstructed image block may be obtained by using the motion information, and the reference image block is used to generate a prediction signal of the current to-be-reconstructed image block. That "the decoder side may learn of the target reconstructed image block of the to-be-reconstructed image block by using a same rule as the encoder side" means that if the target reconstructed image block determined by the encoder side is an upper-left reconstructed image block of the current to-be-encoded image block, the target reconstructed image block determined by the decoder side is also an upper-left reconstructed image block of the current to-be-reconstructed image block. Based on this, after the decoder side obtains the target reconstructed image block, the decoder side may determine the location information of the target reconstructed image block. Two second transform core pairs are determined by looking up Table 2. In this case, the decoder side does not need to calculate rate-distortion costs separately corresponding to the two second transform core pairs, to determine the first transform core pair, but determines the first transform core pair based on the indication information.

A beneficial effect is as follows: The encoder side needs to transmit only 1-bit indication information, for the decoder side to determine the first transform core pair. In the prior art, the encoder side needs to transmit an identifier corresponding to each transform core pair. Taking the H.266 standard as an example, there are five transform core pairs. In this case, the encoder side needs to transmit 3-bit identifier information, for the decoder side to determine the first transform core pair. Therefore, overheads of the encoder side can be reduced by using this method. In addition, the decoder side does not need to calculate rate-distortion costs separately corresponding to two second transform core pairs, to determine the first transform core pair, but determines the first transform core pair based on the indication information. In this way, decoding complexity is reduced and decoding efficiency is improved.

Description is provided for step S610: If there is only one inter-frame transform mode, the decoder side directly uses the first transform core pair as an optimal transform core pair, and performs inverse transform on the current to-be-reconstructed image block by using the first transform core pair, to reconstruct the current to-be-reconstructed image block. If there are a plurality of inter-frame transform modes, because the decoder side has determined a corresponding first transform core pair for each inter-frame transform mode, a transform core pair corresponding to a minimum rate-distortion cost is finally selected from these first transform core pairs as an optimal transform core pair, and inverse transform is performed on the current to-be-reconstructed image block by using the optimal transform core pair, to reconstruct the current to-be-reconstructed image block.

Further, inverse transform may be performed on the current to-be-reconstructed image block in an existing inverse transform manner. Details are not described in this application.

In view of the above, according to the method provided in this application, overheads of the encoder side can be reduced, and decoding complexity can be reduced, thereby improving decoding efficiency.

To better describe technical effects of this application, the following provides performance data corresponding to the technical solutions of this application and performance data corresponding to the prior art.

Prior art: The prior art 1 has been adopted by a standard and is currently integrated into a Joint Exploration Model (JEM). Based on transform in the original H.265 standard, this technology introduces new transform cores DST7 and DCT8 into the H.266 video encoding standard, and the transform cores DST7 and DCT8 are combined to form a multi-core transform technology. This technology is specifically as follows:

Step 1: Calculation of a Rate-Distortion Cost of a Default Transform Core Pair

In this step, a transform core pair in the original H.265 standard is used to perform transform, quantization, and entropy encoding on a current to-be-encoded image block, to calculate a rate-distortion cost.

Step 2: Calculation a Rate-Distortion Cost of a Multi-Core Transform Core Pair

For example, (DOT, DCT2) in the H.266 standard is used to transform the current to-be-encoded image block, and then a rate-distortion cost (RDCostl) is calculated through quantization and entropy encoding. If the calculated rate-distortion cost is greater than 1.1 times a minimum rate-distortion cost of the tried mode that is calculated in step 1, the rate-distortion cost calculation process of the multi-core transform core pair is skipped, and the transform core pair in the original H.265 standard is selected to encode the current to-be-encoded image block. Otherwise, four transform core pairs (DCT8, DCT8), (DST7, DST7), (DCT8, DST7), and (DST7, DCT8) are separately used to transform the current to-be-encoded image block, and then rate-distortion costs RDCost2, RDCost3, RDCost4, and RDCost5 of the four pairs are calculated through quantization and entropy encoding.

Step 3: Selection of a Transform Core Pair

Based on step 1 and step 2, several rate-distortion costs are obtained. In step 3, an optimal transform core pair is determined for the current to-be-encoded image block according to a minimum rate-distortion cost criterion.

For example, in H.266, five rate-distortion costs are obtained in the foregoing steps. In this step, values of the five rate-distortion costs are compared, and a transform core pair corresponding to a minimum rate-distortion cost is selected as the optimal transform core pair of the current block and is marked.

If RDCost1<min{RDCOst2, RDCos3, RDCost4, RDCost5}, (DCT2, DCT2) is selected.

If RDCost2<min{RDCOst1, RDCos3, RDCost4, RDCost5}, (DCT8, DCT8) is selected.

If RDCost3<min{RDCOst2, RDCos1, RDCost4, RDCost5}, (DCT8, DST7) is selected.

If RDCost4<min{RDCOst2, RDCos3, RDCost1, RDCost5}, (DST7, DCT8) is selected.

If RDCost5<min{RDCOst2, RDCos3, RDCost4, RDCost1}, (DST7, DST7) is selected.

Note: min{A,B}=A indicates that a smaller one in A and B is selected.

Step 4: Entropy Encoding

In this step, flag information indicating which transform core pair is selected in the foregoing two steps needs to be transmitted to a decoder side as needed. Therefore, an entropy encoding process is needed. Binary encoding is context-based arithmetic encoding. A quantity of initial models of a context is related to a binary bit or a depth of the current to-be-encoded image block.

For example, in the H.266 standard, if the optimal transform core pair of the current to-be-encoded image block is (DCT2, DCT2), a flag is 1; otherwise, a flag is 0, indicating that a multi-core transform technology is to be used. In the multi-core transform, if (DCT8, DCT8) is selected, a flag of the current block is 0; if (DCT8, DST7) is selected, the flag is 1; if (DST7, DCT8) is selected, the flag is 2; and if (DST7, DST7) is selected, the flag is 3. In addition, binarization is shown in Table 3. Then, a binary bit is encoded through mainstream context-based arithmetic encoding, and two context models are used for the encoding. The context-based arithmetic encoding is also used for a flag bit indicating whether the multi-core transform technology is to be used, and five context models are used for the encoding.

TABLE 3

| Transform core pair | Flag | Binarization |
|---|---|---|
| (DCT8, DCT8) | 0 | '00' |
| (DCT8, DST7) | 1 | '10' |
| (DST7, DCT8) | 2 | '01' |
| (DST7, DST7) | 3 | '11' |

The decoder side can determine, based on parsed syntax information without an RDO process, which transform core pair is to be used. A specific process is an inverse process of an entropy encoding process at an encoder side, and a context model is the same as that at the encoder side.

Example 1: For a merge mode, it is assumed that the correspondence shown in Table 1 exists. For another inter-frame transform mode, the encoder side uses a transform core pair (DCT2, DCT2) by default.

Example 2: For a merge mode, it is assumed that the correspondence shown in Table 2 exists. For a TM mode, there are two transform core pairs (DCT2, DCT2) and (DST7, DST7). For another inter-frame transform model, a method in the prior art may be used, that is, each transform core pair is tried, and a transform core pair corresponding to a minimum rate-distortion cost is determined as a first transform core pair.

Example 3: For a merge mode, it is assumed that the correspondence shown in Table 2 exists. For a TM mode, there are two transform core pairs (DCT2, DCT2) and (DST7, DST7). For another inter-frame transform model, there are also two transform core pairs (DCT2, DCT2) and (DST7, DST7).

Example 1 and Example 2 are implemented in the JEM, and a full-sequence test is performed. A test sequence is a common test sequence in the H.266 standard, and a test condition is a common test condition specified by the Joint Video Exploration Team (JVET). In Random Access (RA), low-delay-P (LDP), and low-delay-B (LDB) structures, a baud rate (BD-RATE) is used as an evaluation indicator for encoding performance (the encoding performance refers to bits saved in same encoding reconstruction video quality). A negative value indicates that the encoding performance is improved, and a positive value indicates that the encoding performance is reduced. The test sequence is 420 in a YUV format, and corresponds to three groups of data: luminance (Y) and chrominance (U and V) components. Complexity is measured by time of the encoder side and time of the decoder side. The time of the encoder side is referred to as encoding time (EncT), and the time of the decoder side is referred to as decoding time (DecT). Class below indicates a test sequence set, which is specifically a video, and Overall (Ref) indicates an average value.

1. Table 4 to Table 6 show performance of the prior art.

TABLE 4

| | Over HM-16.6-JEM4.0 | | | | |
|---|---|---|---|---|---|
| RA | Y | U | V | EncT | DecT |
| Class A1 | −1.46% | −0.68% | −0.24% | 118% | 97% |
| Class A2 | −1.17% | −0.10% | −0.02% | 112% | 96% |
| Class B | −1.36% | 0.68% | 0.26% | 116% | 98% |

TABLE 4-continued

| | Over HM-16.6-JEM4.0 | | | | |
|---|---|---|---|---|---|
| RA | Y | U | V | EncT | DecT |
| Class C | −0.53% | 0.51% | 0.24% | 120% | 98% |
| Class D | −0.55% | 0.92% | 0.65% | 119% | 99% |
| Class E | | | | | |
| Overall (Ref) | −1.03% | 0.29% | 0.18% | 117% | 97% |

TABLE 5

| | Over HM-16.6-JEM4.0 | | | | |
|---|---|---|---|---|---|
| LDB | Y | U | V | EncT | DecT |
| Class A1 | | | | | |
| Class A2 | | | | | |
| Class B | −1.61% | 0.61% | 0.55% | 125% | 96% |
| Class C | −0.58% | 1.24% | 1.21% | 128% | 97% |
| Class D | −0.51% | 1.41% | 0.90% | 123% | 104% |
| Class E | −0.75% | 0.69% | 1.07% | 111% | 99% |
| Overall (Ref) | −0.91% | 0.98% | 0.90% | 122% | 99% |

TABLE 6

| | Over HM-16.6-JEM4.0 | | | | |
|---|---|---|---|---|---|
| LDP | Y | U | V | EncT | DecT |
| Class A1 | | | | | |
| Class A2 | | | | | |
| Class B | −1.52% | 0.75% | 0.53% | 131% | 95% |
| Class C | −0.75% | 1.29% | 1.05% | 135% | 99% |
| Class D | −0.51% | 1.16% | 0.85% | 129% | 99% |
| Class E | −0.68% | 0.64% | 1.17% | 118% | 96% |
| Overall (Ref) | −0.92% | 0.97% | 0.86% | 129% | 97% |

Test condition: A length of a JEM4.0 encoding sequence is 1 s, Frame Rate Up-Conversion (FRUC) and inter-frame EMT are enabled, and another tool is disabled.

2. Table 7 to Table 9 show encoding performance of Example 1.

TABLE 7

| | Over HM-16.6-JEM4.0 | | | | |
|---|---|---|---|---|---|
| RA | Y | U | V | EncT | DecT |
| Class A1 | −0.96% | −0.63% | −0.51% | 104% | 101% |
| Class A2 | −0.89% | −0.04% | −0.27% | 104% | 101% |
| Class B | −0.83% | 0.04% | −0.05% | 105% | 102% |
| Class C | −0.31% | 0.17% | 0.39% | 103% | 100% |
| Class D | −0.50% | 0.51% | 0.32% | 103% | 100% |
| Class E | | | | | |
| Overall (Ref) | −0.70% | 0.01% | −0.03% | 104% | 101% |

TABLE 8

| | Over HM-16.6-JEM4.0 | | | | |
|---|---|---|---|---|---|
| LDB | Y | U | V | EncT | DecT |
| Class A1 | | | | | |
| Class A2 | | | | | |
| Class B | −1.00% | −0.09% | 0.24% | 107% | 101% |
| Class C | −0.48% | 0.73% | 0.41% | 106% | 99% |
| Class D | −0.30% | 0.54% | 0.66% | 105% | 101% |
| Class E | −0.81% | 0.06% | 0.28% | 105% | 100% |
| Overall (Ref) | −0.66% | 0.30% | 0.40% | 106% | 100% |

TABLE 9

| LDP | Over HM-16.6-JEM4.0 | | | | |
|---|---|---|---|---|---|
| | Y | U | V | EncT | DecT |
| Class A1 | | | | | |
| Class A2 | | | | | |
| Class B | −0.99% | 0.44% | 0.29% | 109% | 101% |
| Class C | −0.50% | 0.61% | 0.62% | 109% | 101% |
| Class D | −0.33% | 0.81% | 0.54% | 107% | 100% |

TABLE 9-continued

| LDP | Over HM-16.6-JEM4.0 | | | | |
|---|---|---|---|---|---|
| | Y | U | V | EncT | DecT |
| Class E | −0.81% | 0.23% | 0.59% | 107% | 100% |
| Overall (Ref) | −0.67% | 0.53% | 0.49% | 108% | 100% |

Test condition: A length of a JEM4.0 encoding sequence is 1 s, FRUC and inter-frame EMT are enabled, and another tool is disabled.

3. Table 10 to Table 12 show encoding performance of Example 2.

TABLE 10

Random Access Main 10

| RA | Over HM-16.6-JEM5.0.1 (parallel, VC2015), EMT = 0 | | | | | Over HM-16.6-JEM5.0.1 (parallel, VC2015), EMT = 2 | | | | |
|---|---|---|---|---|---|---|---|---|---|---|
| | Y | U | V | EncT | DecT | Y | U | V | EncT | DecT |
| Class A1 | −1.13% | 0.01% | 0.22% | 109% | 100% | 0.15% | 0.15% | 0.03% | 96% | 102% |
| Class A2 | −1.02% | −0.19% | −0.17% | 106% | 100% | 0.23% | −0.32% | −0.09% | 197% | 101% |
| Class B | −1.09% | 0.89% | 0.43% | 107% | 99% | 0.35% | 0.14% | 0.04% | 96% | 102% |
| Class C | −0.40% | 1.12% | 0.74% | 108% | 100% | 0.12% | 0.36% | 0.30% | 97% | 101% |
| Class D | −0.54% | 0.62% | −1.10% | 107% | 100% | −0.10% | 0.40% | 0.07% | 97% | 100% |
| Class E | | | | | | | | | | |
| Overall (Ref) | −0.85% | 0.51% | 0.04% | 107% | 100% | 0.16% | 0.15% | 0.04% | 97% | 101% |
| Class F | −0.08% | 0.56% | −1.25% | 105% | 100% | 0.03% | 0.25% | 0.70% | 97% | 101% |

TABLE 11

Low delay main 10

| LB | Over HM-16.6-JEM5.0.1 (parallel, VC2015), EMT = 0 | | | | | Over HM-16.6-JEM5.0.1 (parallel, VC2015), EMT = 2 | | | | |
|---|---|---|---|---|---|---|---|---|---|---|
| | Y | U | V | EncT | DecT | Y | U | V | EncT | DecT |
| Class A1 | | | | | | | | | | |
| Class A2 | | | | | | | | | | |
| Class B | −1.31% | 0.62% | 0.41% | 112% | 98% | 0.21% | −0.11% | −0.23% | 96% | 104% |
| Class C | −0.69% | 0.69% | 0.67% | 110% | 100% | −0.09% | −0.22% | −0.41% | 97% | 103% |
| Class D | −0.53% | 1.34% | 1.30% | 108% | 100% | −0.02% | −0.54% | −0.08% | 97% | 102% |
| Class E | −0.64% | 0.87% | 0.73% | 111% | 100% | 0.08% | −0.39% | −0.78% | 97% | 102% |
| Overall (Ref) | −0.84% | 0.86% | 0.76% | 110% | 100% | 0.05% | −0.30% | −0.34% | 97% | 103% |
| Class F (optional) | −0.20% | 0.46% | 1.09% | 107% | 101% | −0.08% | −0.11% | −0.31% | 97% | 102% |

TABLE 12

Low delay main 10

| LP | Over HM-16.6-JEM5.0.1 (parallel, VC2015), EMT = 0 | | | | | Over HM-16.6-JEM5.0.1 (parallel, VC2015), EMT = 2 | | | | |
|---|---|---|---|---|---|---|---|---|---|---|
| | Y | U | V | EncT | DecT | Y | U | V | EncT | DecT |
| Class A1 | | | | | | | | | | |
| Class A2 | | | | | | | | | | |
| Class B | −1.31% | 0.75% | 0.29% | 116% | 100% | 0.20% | −0.34% | −0.28% | 94% | 102% |
| Class C | −0.64% | 0.79% | 0.85% | 115% | 101% | 0.07% | −0.41% | −0.30% | 94% | 103% |
| Class D | −0.63% | 0.14% | 0.71% | 112% | 100% | −0.02% | −0.18% | −0.35% | 95% | 101% |
| Class E | −0.45% | 0.97% | 0.99% | 112% | 101% | −0.13% | −0.26% | −0.32% | 96% | 102% |
| Overall (Ref) | −0.81% | 0.65% | 0.66% | 114% | 100% | 0.05% | −0.30% | −0.31% | 94% | 102% |
| Class F | −0.24% | 0.13% | 0.76% | 109% | 102% | −0.23% | −0.34% | 0.48% | 95% | 101% |

Test condition: A length of a JEM5.0.1 encoding sequence is 1 s, FRUC and inter-frame EMT are enabled, and another tool is disabled.

Columns 2 to 6 indicate performance of Example 2 relative to EMT OFF in the JEM, and columns 7 to 11 indicate performance of Example 2 relative to the JEM.

TABLE 13

|  | Y | U | V |
|---|---|---|---|
| Class A1 |  |  |  |
| Class A2 |  |  |  |
| Class B | 0.08% | −0.07% | −0.41% |
| Class C | −0.05% | −0.24% | −0.37% |
| Class D | −0.24% | −0.12% | −0.16% |
| Class E | −0.32% | 0.32% | −0.05% |
| Overall (Ref) | −0.11% | −0.05% | −0.27% |

Test condition: Performance in a common test condition in LDB JEM5.0.1

TABLE 14

|  | Y | U | V |
|---|---|---|---|
| Class A1 |  |  |  |
| Class A2 |  |  |  |
| Class B | 0.03% | 0.23% | 0.46% |
| Class C | −0.07% | −0.25% | −0.63% |
| Class D | −0.18% | −0.25% | 0.43% |
| Class E | −0.23% | 0.01% | −0.12% |
| Overall (Ref) | −0.10% | −0.05% | 0.07% |

Test condition: Performance in a common test condition in LDP JEM5.0.1

4. Table 15 to Table 17 show encoding performance of Example 3.

TABLE 15

Random access main 10
Over HM-16.6-JEM5 (parallel, goc6.2)

| RA | Y | U | V | EncT | DecT | Y | U | V | EncT | DecT |
|---|---|---|---|---|---|---|---|---|---|---|
| Class A1 | −0.90% | 0.30% | 0.24% | 107% | 99% | −1.28% | −0.13% | 0.20% | 114% | 100% |
| Class A2 | −0.83% | 0.16% | −0.12% | 105% | 102% | −1.25% | 0.13% | −0.08% | 110% | 100% |
| Class B | −0.94% | 0.56% | 0.35% | 106% | 99% | −1.44% | 0.75% | 0.04% | 111% | 97% |
| Class C | −0.33% | 0.65% | 0.68% | 105% | 99% | −0.53% | 0.76% | 0.44% | 111% | 98% |
| Class D | −0.41% | 0.07% | −0.46% | 104% | 100% | −0.43% | 0.23% | −1.02% | 109% | 100% |
| Class E |  |  |  |  |  |  |  |  |  |  |
| Overall (Ref) | −0.69% | 0.36% | 0.15% | 105% | 100% | −1.01% | 0.37% | 0.01% | 111% | 99% |
| Class F | −0.01% | 0.49% | −2.22% | 105% | 102% | −0.11% | 0.33% | −1.87% | 108% | 99% |

TABLE 16

Low delay main 10
Over HM-16.6-JEM5 (parallel, goc6.2)

| LB | Y | U | V | EncT | DecT | Y | U | V | EncT | DecT |
|---|---|---|---|---|---|---|---|---|---|---|
| Class A1 |  |  |  |  |  |  |  |  |  |  |
| Class A2 |  |  |  |  |  |  |  |  |  |  |
| Class B | −1.12% | 0.55% | 0.22% | 107% | 96% | −1.52% | 0.73% | 0.64% | 117% | 94% |
| Class C | −0.53% | 0.52% | 0.97% | 106% | 98% | −0.60% | 0.91% | 1.09% | 114% | 96% |
| Class D | −0.37% | 1.28% | 0.67% | 104% | 99% | −0.51% | 1.90% | 1.38% | 112% | 98% |
| Class E | −0.58% | 1.00% | 0.92% | 104% | 98% | −0.72% | 1.28% | 1.52% | 113% | 99% |
| Overall (Ref) | −0.69% | 0.81% | 0.65% | 106% | 98% | −0.89% | 1.17% | 1.10% | 114% | 97% |
| Class F | −0.37% | 0.08% | 0.55% | 105% | 101% | −0.12% | 0.62% | 1.42% | 111% | 100% |

TABLE 17

Low delay main 10
Over HM-16.6-JEM5 (parallel, goc6.2)

| LP | Y | U | V | EncT | DecT | Y | U | V | EncT | DecT |
|---|---|---|---|---|---|---|---|---|---|---|
| Class A1 |  |  |  |  |  |  |  |  |  |  |
| Class A2 |  |  |  |  |  |  |  |  |  |  |
| Class B | −1.17% | 0.61% | 0.19% | 110% | 102% | −1.51% | 1.10% | 0.57% | 123% | 99% |
| Class C | −0.71% | 0.50% | 0.77% | 110% | 101% | −0.71% | 1.21% | 1.15% | 122% | 98% |
| Class D | −0.49% | 0.06% | 0.69% | 108% | 100% | −0.61% | 0.32% | 1.07% | 118% | 99% |
| Class E | −0.60% | 0.74% | 0.64% | 106% | 100% | −0.31% | 1.23% | 1.31% | 117% | 100% |
| Overall (Ref) | −0.78% | 0.47% | 0.55% | 109% | 101% | −0.86% | 0.96% | 0.98% | 121% | 99% |
| Class F | −0.35% | 0.00% | 0.44% | 108% | 103% | −0.01% | −0.21% | 0.33% | 115% | 99% |

Test condition: A length of a JEM5.0.1 encoding sequence is 1 s, FRUC and inter-frame EMT are enabled, and another tool is disabled.

Columns 2 to 6 indicate performance data of Example 3 in the JEM, and columns 7 to 11 indicate performance data of the prior art in the JEM.

It can be learned from the performance data of the prior art and Example 1 that, in comparison with the prior art, in this application, encoding complexity is greatly reduced on the premise of a relatively small performance loss, and a balance between encoding complexity and encoding performance is well achieved.

In Example 2, the merge mode and the TM mode adopt location-dependent inter-frame transform. It can be learned from the performance data of Example 2 that, encoding complexity is reduced (about 3% to 6%) at the encoder side on the premise that there is almost no encoding loss in LDP and LDB configurations, and encoding complexity is also reduced in an RA configuration, so that a balance between performance and complexity is well achieved. In particular, under a common test condition specified by JVET, encoding performance in the LDP and LDB encoding configurations can be improved, and performance of a luminance component can be improved by 0.11% and 0.10% on average.

In Example 3, not only the merge mode and the TM mode adopt the location-dependent inter-frame transform, but also another inter-frame mode adopts the transform twice. It can be learned from the performance data of Example 3 that, on the premise that a performance loss is very small, complexity of a multi-core transform technology in the JEM is reduced by about 50% at the encoder side, so that a balance between encoding performance and encoding complexity is well achieved.

Figure 7:
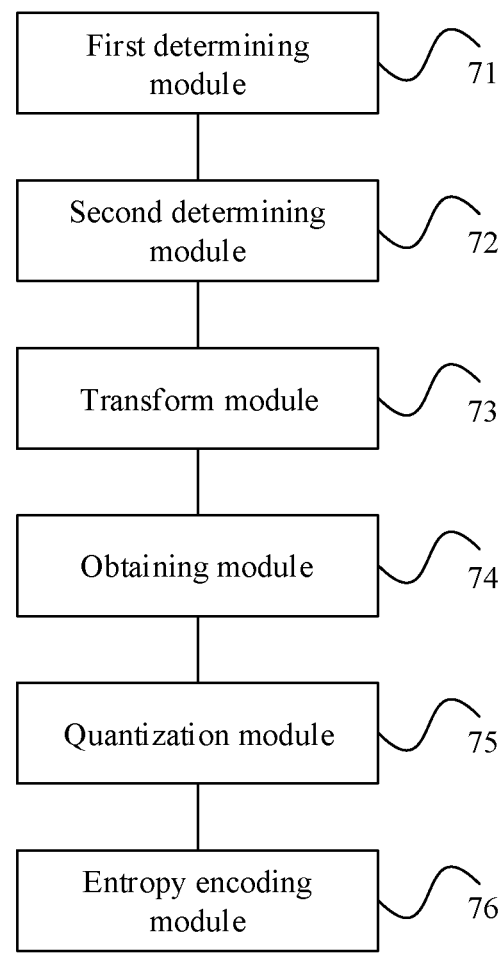
FIG. 7 is a schematic structural diagram of an image encoding apparatus according to an embodiment of this application.

FIG. 7 is a schematic structural diagram of an image encoding apparatus 70 according to an embodiment of this application. The apparatus 70 may be an encoder, a terminal device including an encoder, a chip with a similar function as an encoder, or the like. As shown in FIG. 7, the apparatus 70 includes:

a first determining module 71, configured to determine location information of a target reconstructed image block of a current to-be-encoded image block, where the target reconstructed image block is a reconstructed image block used to determine motion information of the current to-be-encoded image block;

a second determining module 72, configured to determine a first transform core pair based on the location information of the target reconstructed image block that is determined by the first determining module 71; and a transform module 73, configured to transform a residual signal of the current to-be-encoded image block based on the first transform core pair determined by the second determining module 72, to obtain a transform coefficient.

Optionally, the image encoding apparatus further includes an obtaining module 74, configured to obtain a correspondence between location information of at least one reconstructed image block and at least one transform core pair.

Correspondingly, the second determining module 72 is configured to determine the first transform core pair based on the correspondence and the location information of the target reconstructed image block.

Optionally, the second determining module 72 is configured to: determine at least two second transform core pairs based on the correspondence and the location information of the target reconstructed image block; encode the current to-be-encoded image block based on each of the at least two second transform core pairs, and determine a rate-distortion cost corresponding to the current to-be-encoded image block obtained after the encoding; and use a second transform core pair corresponding to a minimum rate-distortion cost as the first transform core pair.

Optionally, as shown in FIG. 7, the image encoding apparatus 70 further includes:

a quantization module 75, configured to quantize the transform coefficient to obtain a quantized transform coefficient of the current to-be-encoded image block; and an entropy encoding module 76, configured to perform entropy encoding on the quantized transform coefficient and auxiliary encoding information of the current to-be-encoded image block to obtain a bitstream, where the auxiliary coding information includes an identifier of an inter-frame transform mode and indication information, and the indication information is used to indicate an index of the first transform core pair.

The image encoding apparatus provided in this application may perform the foregoing image encoding method. For corresponding content and effects, refer to the content and effects of the image encoding method. Details are not described in this application.

Figure 8:
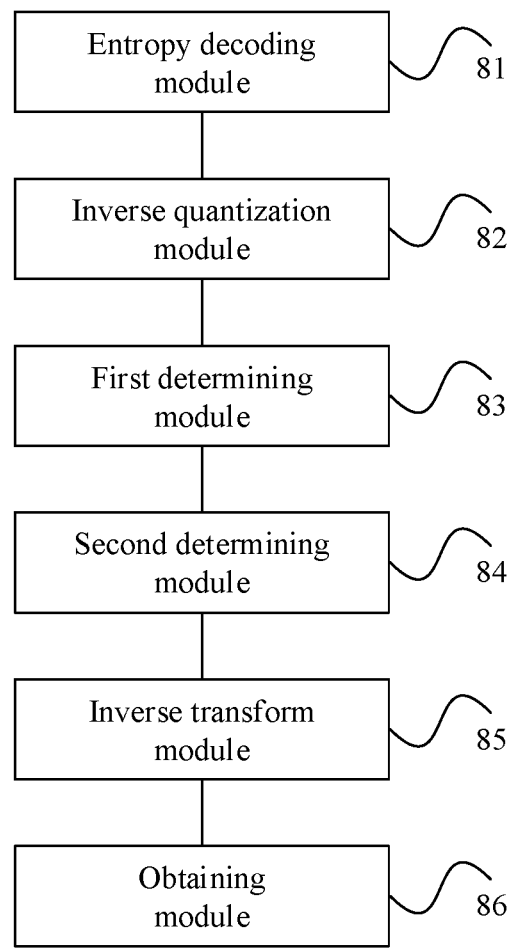
FIG. 8 is a schematic structural diagram of an image decoding apparatus according to an embodiment of this application.

FIG. 8 is a schematic structural diagram of an image decoding apparatus 80 according to an embodiment of this application. The apparatus 80 may be a decoder, a terminal device including a decoder, a chip with a similar function as a decoder, or the like. As shown in FIG. 8, the apparatus 80 includes:

an entropy decoding module 81, configured to perform entropy decoding on a bitstream to obtain a quantized transform coefficient of a current to-be-reconstructed image block;

an inverse quantization module 82, configured to perform inverse quantization on the quantized transform coefficient to obtain a transform coefficient of the current to-be-reconstructed image block;

a first determining module 83, configured to determine location information of a target reconstructed image block of the current to-be-reconstructed image block, where the target reconstructed image block is a reconstructed image block used to determine motion information of the current to-be-reconstructed image block;

a second determining module 84, configured to determine a first transform core pair based on the location information of the target reconstructed image block; and an inverse transform module 85, configured to perform inverse transform on the transform coefficient based on the first transform core pair, to reconstruct the current to-be-reconstructed image block.

Optionally, the apparatus 80 further includes:

an obtaining module 86, configured to obtain a correspondence between location information of at least one reconstructed image block and at least one transform core pair.

Correspondingly, the second determining module 84 is configured to determine the first transform core pair based on the correspondence and the location information of the target reconstructed image block.

Optionally, the bitstream further carries indication information, and the indication information is used to indicate an index of the first transform core pair.

Correspondingly, the second determining module 84 is configured to: determine at least two second transform core pairs based on the correspondence and the location information of the target reconstructed image block; and determine the first transform core pair in the at least two second transform core pairs based on the index of the first transform core pair.

The image decoding apparatus provided in this application may perform the foregoing image decoding method. For corresponding content and effects, refer to the content and effects of the image decoding method. Details are not described in this application.

An embodiment of this application provides an image encoding and decoding system, which is also referred to as a video encoding and decoding system. The system includes the image encoding apparatus shown in FIG. 7 and the image decoding apparatus shown in FIG. 8. The system may be disposed in a same video encoding and decoding apparatus or electronic device. In the electronic device, the image encoding apparatus and the image decoding apparatus may be integrated together, and may be collectively referred to as a codec. Alternatively, the system is disposed in different apparatuses. The following separately describes the two cases with reference to the accompanying drawings.

Figure 9:
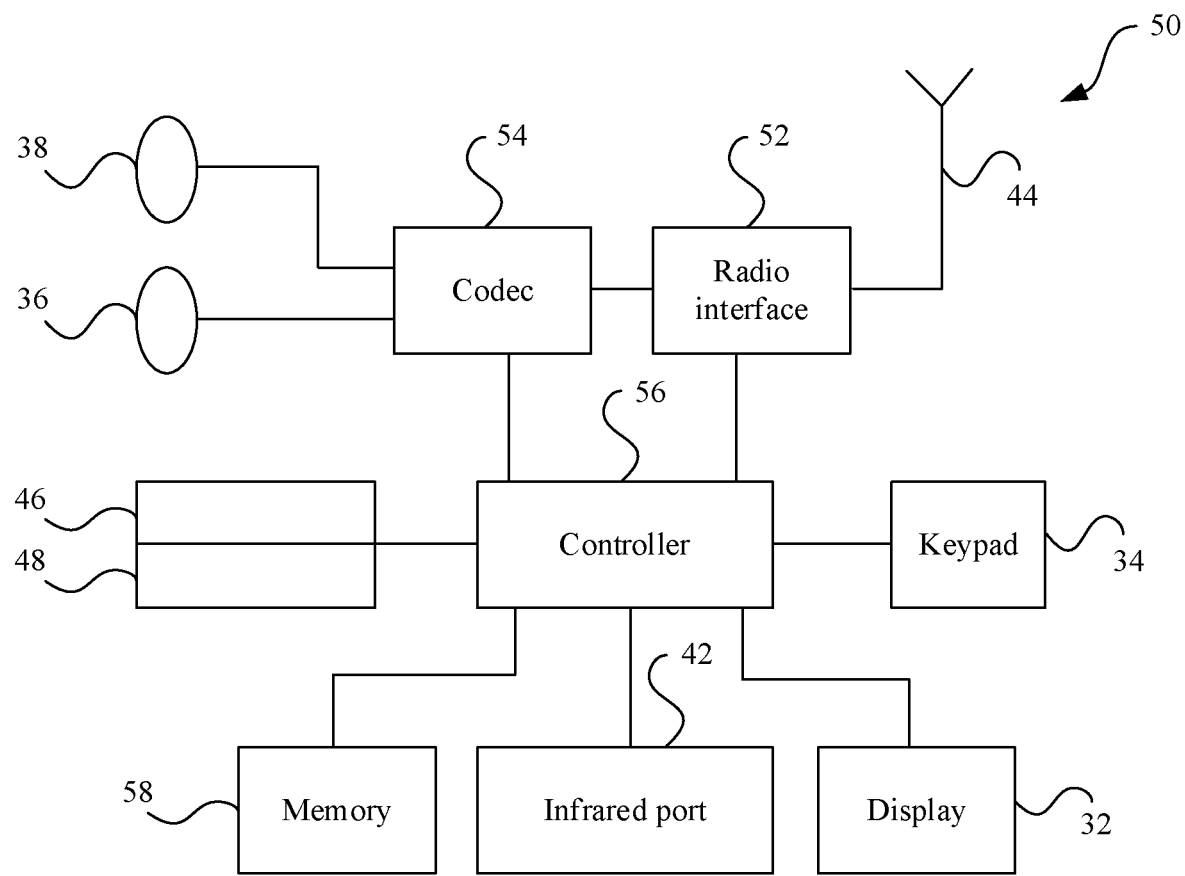
FIG. 9 is a schematic block diagram of a video encoding and decoding apparatus or an electronic device.
Figure 10:
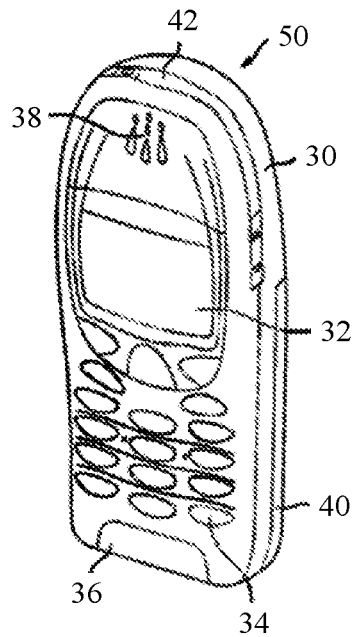
FIG. 10 is a schematic diagram of a video encoding apparatus according to an embodiment of this application.

FIG. 9 is a schematic block diagram of a video encoding and decoding apparatus or an electronic device 50. The apparatus or electronic device may be integrated into the foregoing codec. FIG. 10 is a schematic diagram of a video encoding apparatus according to an embodiment of this application. The following describes units in FIG. 9 and FIG. 10.

The electronic device 50 may be, for example, a mobile terminal or user equipment in a wireless communications system. It should be understood that the embodiments of this application may be implemented in any electronic device or apparatus that may need to encode and decode, or encode, or decode a video image.

The electronic device 50 may include a housing 30 that is configured to be integrated into and protect a device. The electronic device 50 may further include a display 32 in a form of a liquid crystal display. In another embodiment of this application, the display may be any appropriate display technology suitable for displaying an image or a video. The electronic device 50 may further include a keypad 34. In another embodiment of this application, any appropriate data or user interface mechanism may be used. For example, a user interface may be implemented as a virtual keyboard, or a data recording system may be implemented as a part of a touch-sensitive display. The electronic device 50 may include a microphone 36 or any appropriate audio input, and the audio input may be digital or analog signal input. The electronic device 50 may further include the following audio output device. The audio output device in this embodiment of this application may be any one of a headset 38, a loudspeaker, and an analog audio or digital audio output connection. The electronic device 50 may also include a battery 40. In another embodiment of this application, the device may be powered by any appropriate mobile energy device such as a solar cell, a fuel cell, or a clock mechanism generator. The electronic device 50 may further include an infrared port 42 used for short-range line-of-sight communication with another device. In other embodiments, the apparatus 50 may further include any appropriate short-range communication solution such as a Bluetooth wireless connection or a USB/live line wired connection.

The electronic device 50 may include a controller 56 or a processor configured to control the electronic device 50. The controller 56 may be connected to a memory 58. In this embodiment of this application, the memory 58 may store data that is in a form of an image and data that is in a form of audio, and/or may store an instruction to be implemented by the controller 56. The controller 56 may be further connected to a codec circuit 54 that is suitable for implementing audio and/or video data encoding and decoding, or that is suitable for implementing auxiliary encoding and decoding by the controller 56.

The electronic device 50 may further include a smartcard 46 and a card reader 48, such as a UICC and a UICC reader, that are configured to provide user information and that are suitable for providing authentication information used for network authentication and user authorization.

The electronic device 50 may further include a radio interface circuit 52. The radio interface circuit 52 is connected to the controller 56 and is suitable for generating a wireless communication signal used for communication with a cellular communications network, a wireless communications system, or a wireless local area network, and the like. The electronic device 50 may further include an antenna 44. The antenna 44 is connected to the radio interface circuit 52, and is configured to send, to another apparatus (or a plurality of apparatuses), a radio frequency signal generated in the radio interface circuit 52, and receive a radio frequency signal from the another apparatus (or the plurality of apparatuses).

In some embodiments of this application, the electronic device 50 includes a camera that can record or detect single frames, and the codec 54 or the controller receives and processes these single frames. In some embodiments of this application, the apparatus may receive to-be-processed video image data from another device before transmission and/or storage. In some embodiments of this application, the electronic device 50 may receive an image through a wireless or wired connection for encoding/decoding.

It should be understood that FIG. 10 is only a schematic diagram of the electronic device 50 and software and hardware modules included in the electronic device 50, and has a plurality of different implementations. For example, the keypad 34 may be a touchscreen, and the touchscreen may be a part of the display 32. This is not limited.

Figure 11:
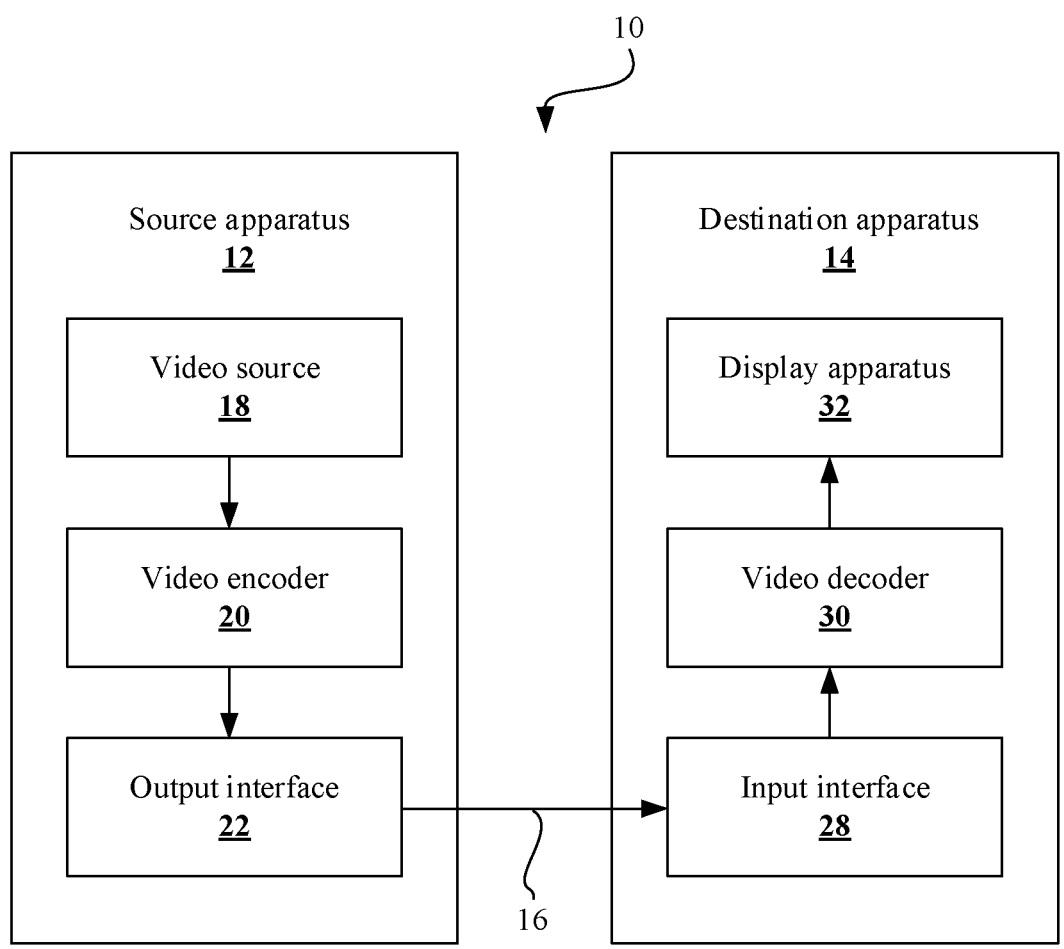
FIG. 11 is a schematic block diagram of a video encoding and decoding system according to an embodiment of this application.

FIG. 11 is a schematic block diagram of a video encoding and decoding system 10 according to an embodiment of this application. As shown in FIG. 11, the video encoding and decoding system 10 includes a source apparatus 12 and a destination apparatus 14. The source apparatus 12 generates encoded video data. Therefore, the source apparatus 12 may be referred to as a video encoding apparatus, a video encoding device, or the image encoding apparatus described in this application. The destination apparatus 14 may decode the encoded video data generated by the source apparatus 12. Therefore, the destination apparatus 14 may be referred to as a video decoding apparatus, a video decoding device, or the image decoding apparatus in this application. The source apparatus 12 and the destination apparatus 14 may be examples of a video encoding and decoding apparatus or a video encoding and decoding device. The source apparatus 12 and the destination apparatus 14 may include a wide range of apparatuses, including a desktop computer, a mobile computing apparatus, a notebook (for example, laptop) computer, a tablet computer, a set top box, a handheld phone such as a smartphone, a television, a camera, a display apparatus, a digital media player, a video game console, an in-vehicle computer, or other similar apparatus.

The destination apparatus 14 may receive the encoded video data from the source apparatus 12 through a channel 16. The channel 16 may include one or more media and/or apparatuses that can move the encoded video data from the source apparatus 12 to the destination apparatus 14. In an example, the channel 16 may include one or more communications media that can enable the source apparatus 12 to directly transmit the encoded video data to the destination apparatus 14 in real time. In this example, the source apparatus 12 may modulate the encoded video data according to a communications standard (for example, a wireless communications protocol), and may transmit the modulated video data to the destination apparatus 14. The one or more communications media may include wireless and/or wired communications media, for example, a radio frequency (RF) spectrum or one or more physical transmission lines. The one or more communications media may form a part of a packet-based network (such as a local area network, a wide area network, or a global network (for example, the internet)). The one or more communications media may include a router, a switch, a base station, or another device facilitating communication between the source apparatus 12 and the destination apparatus 14.

In another example, the channel 16 may include a storage medium that stores the encoded video data generated by the source apparatus 12. In this example, the destination apparatus 14 may access the storage medium through disk access or card access. The storage medium may include a plurality of locally accessible data storage media such as Blu-ray, a DVD, a CD-ROM, a flash memory, or another suitable digital storage medium configured to store encoded video data.

In another example, the channel 16 may include a file server or another intermediate storage apparatus that stores the encoded video data generated by the source apparatus 12. In this example, the destination apparatus 14 may access, through streaming transmission or downloading, the encoded video data stored in the file server or the another intermediate storage apparatus. The file server may be of a server type that can store the encoded video data and transmit the encoded video data to the destination apparatus 14. For example, the file server includes a web server (for example, used for a website), a file transfer protocol (FTP) server, a network attached storage (NAS) apparatus, and a local disk drive.

The destination apparatus 14 may access the encoded video data through a standard data connection (for example, an internet connection). An example type of the data connection includes a wireless channel (for example, a Wi-Fi connection) that is suitable for accessing the encoded video data stored in the file server, a wired connection (for example, a DSL or a cable modem), or a combination thereof. The encoded video data may be transmitted from the file server through the streaming transmission, the downloading transmission, or a combination thereof.

The technology of this application is not limited to a wireless application scenario. For example, the technology may be applied to video encoding and decoding in a plurality of multimedia applications that support the following applications: over-the-air television broadcasting, cable television transmission, satellite television transmission, streaming-transmission video transmission (for example, through the internet), encoding of video data stored in a data storage medium, decoding of video data stored in a data storage medium, or another application. In some examples, the video encoding and decoding system 10 may be configured to support unidirectional or bidirectional video transmission, so as to support applications such as streaming video transmission, video play, video broadcasting, and/or videotelephony.

In an example in FIG. 11, the source apparatus 12 includes a video source 18, a video encoder 20, and an output interface 22. In some examples, the output interface 22 may include a modulator/demodulator (a modem) and/or a transmitter. The video source 18 may include a video capturing apparatus (for example, a video camera), a video archive including pre-captured video data, a video input interface configured to receive video data from a video content provider, and/or a computer graphics system configured to generate video data, or a combination of the foregoing video data sources.

The video encoder 20 may encode video data from the video source 18. In some examples, the source apparatus 12 directly transmits the encoded video data to the destination apparatus 14 by using the output interface 22. The encoded video data may be further stored in a storage medium or a file server, so that the destination apparatus 14 accesses the encoded video data later for decoding and/or playing.

In the example in FIG. 11, the destination apparatus 14 includes an input interface 28, a video decoder 30, and a display apparatus 32. In some examples, the input interface 28 includes a receiver and/or a modem. The input interface 28 may receive the encoded video data through the channel 16. The display apparatus 32 may be integrated with the destination apparatus 14 or may be outside the destination apparatus 14. Usually, the display apparatus 32 displays decoded video data. The display apparatus 32 may include a plurality of types of display apparatuses such as a liquid crystal display (LCD), a plasma display, an organic light-emitting diode (OLED) display, or a display apparatus of another type.

The video encoder 20 and the video decoder 30 may operate according to a video compression standard (for example, the high efficiency video coding H.265 standard), and may comply with the HEVC test model (HM). The text description ITU-TH.265 (V3) (04/2015) of the H.265 standard is released on Apr. 29, 2015, and may be downloaded from http://handle.itu.int/11.1002/1000/12455. The file is incorporated by reference in its entirety.

Aspects of this application provide a storage medium, including an instruction. When the instruction is run on an image encoding apparatus, the image encoding apparatus is enabled to perform the foregoing image encoding method.

Aspects of this application provide a storage medium, including an instruction. When the instruction is run on an image decoding apparatus, the image decoding apparatus is enabled to perform the foregoing image decoding method.

Aspects of this application provide a computer program product. When the computer program product is run on an image encoding apparatus, the image encoding apparatus is enabled to perform the foregoing image encoding method.

Aspects of this application provide a computer program product. When the computer program product is run on an image decoding apparatus, the image decoding apparatus is enabled to perform the foregoing image decoding method.

What is claimed is:
1. A method, comprising:
  determining location information of a target reconstructed image block of a current to-be-encoded image block, wherein the target reconstructed image block is a reconstructed image block used to determine motion information of the current to-be-encoded image block;
  obtaining a correspondence between location information of at least one reconstructed image block and at least one transform core pair, wherein the correspondence is based on a residual distribution of the current-to-be encoded image block and a characteristic of a first transform core pair;
  determining the first transform core pair based on the correspondence and the location information of the target reconstructed image block, the determining comprising:

determining at least two second transform core pairs based on the correspondence and the location information of the target reconstructed image block, encoding the current to-be-encoded image block based on each of the at least two second transform core pairs, and determining a rate-distortion cost corresponding to the current to-be-encoded image block obtained after the encoding, and using one of the at least two second transform core pairs, corresponding to a minimum rate-distortion cost, as the first transform core pair;

transforming a residual signal of the current to-be-encoded image block based on the first transform core pair, to obtain a transform coefficient; and transmitting only 1-bit indication information for a decoder side, wherein the indication information represents an index of the first transform core pair.

2. The method according to claim 1, wherein after the transforming the residual signal of the current to-be-encoded image block based on the first transform core pair; to obtain the transform coefficient; the method further comprises:

quantizing the transform coefficient to obtain a quantized transform coefficient of the current to-be-encoded image block: and performing entropy encoding on the quantized transform coefficient and auxiliary encoding information of the current to-be-encoded image block to obtain a bitstream, wherein the auxiliary encoding information includes an identifier of an inter-frame transform mode and indication information, and the indication information is used to indicate an index of the first transform core pair.

3. The method according to claim 2, wherein the auxiliary encoding information further comprises associated data, wherein the associated data includes at least one of a Sequence Parameter Set (SPS), a Picture Parameter Set (PPS), or another syntax structure.

4. The method according to claim 1, wherein the correspondence between the location information of the at least one reconstructed image block and at least one transform core pair comprises a correspondence between a left reconstructed image block of the current to-be-encoded image block and the first transform core pair, a correspondence between an upper reconstructed image block of the current to-be-encoded image block and the first transform core pair, a correspondence between an upper-right reconstructed image block of the current to-be-encoded image block and a second transform core pair, a correspondence between a lower-left reconstructed image block of the current to-be-encoded image block and the second transform core pair, and a correspondence between an upper-left reconstructed image block of the current to-be-encoded image block and a third transform core pair.

5. The method according to claim 1, wherein the correspondence between the location information of at least one reconstructed image block and at least one transform core pair comprises: a correspondence between a left reconstructed image block of the current to-be-encoded image block and two second transform core pairs, a correspondence between an upper reconstructed image block of the current to-be-encoded image block and the two second transform core pairs, a correspondence between an upper-right reconstructed image block of the current to-be-encoded image block and the two second transform core pairs, a correspondence between a lower-left reconstructed image block of the current to-be-encoded image block and an other two second transform core pairs, and a correspondence between an upper-left reconstructed image block of the current to-be-encoded image block and the two second transform core pairs.

6. A method, comprising:

performing entropy decoding on a bitstream to obtain a quantized transform coefficient of a current to-be-reconstructed image block, and performing inverse quantization on the quantized transform coefficient to obtain a transform coefficient of the current to-be-reconstructed image block;

determining location information of a target reconstructed image block of the current to-be-reconstructed image block, wherein the target reconstructed image block is a reconstructed image block used to determine motion information of the current to-be-reconstructed image block;

obtaining a correspondence between location information of at least one reconstructed image block and at least one transform core pair, wherein the correspondence is based on a residual distribution of the current-to-be encoded image block and a characteristic of a first transform core pair;

determining the first transform core pair based on the location information of the target reconstructed image block and received only 1-bit indication information in the bitstream, where the indication information represents an index of the first transform core pair; and performing inverse transform on the transform coefficient based on the first transform core pair, to reconstruct the current to-be-reconstructed image block.

7. The method according to claim 6, wherein the bitstream carries indication information, and the indication information is used to indicate an index of the first transform core pair; and the determining the first transform core pair based on the correspondence and the location information of the target reconstructed image block comprises:

determining at least two second transform core pairs based on the correspondence and the location information of the target reconstructed image block; and determining the first transform core pair in the at least two second transform core pairs based on the index of the first transform core pair.

8. The method according to claim 6, further comprising:

determining a first transform core pair for each inter-frame transform mode; and selecting a transform core pair corresponding to a minimum rate-distortion cost from these first transform core pairs to reconstruct the current to-be-reconstructed image block.

9. An apparatus, comprising:

a non-transitory memory having processor-executable instructions stored thereon; and a processor, coupled to the memory, configured to execute the processor-executable instructions to:

perform entropy decoding on a bitstream to obtain a quantized transform coefficient of a current to-be-reconstructed image block;

perform inverse quantization on the quantized transform coefficient to obtain a transform coefficient of the current to-be-reconstructed image block;

determine location information of a target reconstructed image block of the current to-be-reconstructed image block, wherein the target reconstructed image block is a reconstructed image block used to determine motion information of the current to-be-reconstructed image block;

obtain a correspondence between location information of at least one reconstructed image block and at least one transform core pair, wherein the correspondence is based on a residual distribution of the current-to-be encoded image block and a characteristic of a first transform core pair;

determine the first transform core pair based on the location information of the target reconstructed image block and received only 1-bit indication information in the bitstream, where the indication information represents an index of the first transform core pair; and perform inverse transform on the transform coefficient based on the first transform core pair, to reconstruct the current to-be-reconstructed image block.

10. The apparatus according to claim 9, wherein the bitstream carries indication information, and the indication information is used to indicate an index of the first transform core pair; and the processor is configured to:

determine at least two second transform core pairs based on the correspondence and the location information of the target reconstructed image block; and determine the first transform core pair in the at least two second transform core pairs based on the index of the first transform core pair.

11. The apparatus according to claim 9, wherein the processor is configured to execute the processor-executable instructions to:

determine a first transform core pair for each inter-frame transform mode; and select a transform core pair corresponding to a minimum rate-distortion cost from these first transform core pairs to reconstruct the current to-be-reconstructed image block.

* * * * *